US009282517B2

(12) United States Patent
Tofighbakhsh et al.

(10) Patent No.: US 9,282,517 B2
(45) Date of Patent: *Mar. 8, 2016

(54) CONTROLLING WIRELESS TRANSITION TIMERS BASED ON APPLICATION AND CONTENT

(71) Applicants: AT&T Intellectual Property I, L.P., Atlanta, GA (US); AT&T Mobility II LLC, Atlanta, GA (US)

(72) Inventors: Mostafa Tofighbakhsh, Cupertino, CA (US); Gaviphat Lekutai, Kirkland, WA (US); David R. Wolter, Austin, TX (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,132

(22) Filed: Jan. 22, 2015

(65) Prior Publication Data
US 2015/0131453 A1 May 14, 2015

Related U.S. Application Data

(63) Continuation of application No. 13/662,915, filed on Oct. 29, 2012, now Pat. No. 8,971,194.

(51) Int. Cl.
H04W 52/02 (2009.01)
H04W 76/04 (2009.01)
H04W 72/04 (2009.01)

(52) U.S. Cl.
CPC ...... *H04W 52/0251* (2013.01); *H04W 52/0261* (2013.01); *H04W 72/048* (2013.01); *H04W 76/046* (2013.01)

(58) Field of Classification Search
None
See application file for complete search history.

(56) References Cited

U.S. PATENT DOCUMENTS

| 7,301,950 | B1* | 11/2007 | Cheong et al. ........... 370/395.21 |
| 8,717,923 | B2 | 5/2014 | Vedantham et al. |
| 8,948,106 | B2* | 2/2015 | Hannu et al. ................. 370/329 |
| 2009/0183016 | A1 | 7/2009 | Chan et al. |

(Continued)

OTHER PUBLICATIONS

Feng Qian, et al. "Characterizing Radio Resource Allocation for 3G Networks." IMC'10, Nov. 1-3, 2010. 14 pages.

(Continued)

*Primary Examiner* — Min Jung
(74) *Attorney, Agent, or Firm* — Amin, Turocy & Watson, LLP

(57) ABSTRACT

Wireless transition timers associated with wireless transition states are adaptively controlled in relation to use of applications by user equipment (UE). A UE can include a transition management component (TMC) that can adaptively control wireless transition timers associated with wireless states based on application type, session content, or other factors. The TMC monitors data flow associated with an application and, for a current or subsequent communication session, controls the length of wireless transition timers and switching between wireless states to improve UE, application, and/or network performance while maintaining QOE for the user. The TMC can access a timer look-up table that maps wireless transition timers to application type, content type, user behavior, or other factors. The TMC also can desirably control maintaining persistence or always-on connections by controlling switching between wireless states using the adapted wireless transition timers.

20 Claims, 13 Drawing Sheets

(56) References Cited

U.S. PATENT DOCUMENTS

| | | | |
|---|---|---|---|
| 2011/0016339 A1 | 1/2011 | Dasgupta et al. | |
| 2011/0222450 A1 | 9/2011 | Youssef et al. | |
| 2011/0269463 A1 | 11/2011 | Wang et al. | |
| 2012/0207070 A1 | 8/2012 | Xu et al. | |
| 2013/0039339 A1 | 2/2013 | Rayavarapu et al. | |
| 2013/0242763 A1 | 9/2013 | Li | |
| 2013/0301504 A1 | 11/2013 | Lenart et al. | |
| 2014/0019743 A1* | 1/2014 | DeLuca | 713/100 |
| 2014/0038674 A1* | 2/2014 | Srinivasan et al. | 455/574 |
| 2015/0085673 A1* | 3/2015 | Ding | 370/241 |

OTHER PUBLICATIONS

GSMA. "Smarter Apps for Smarter Phones: A guide to improve apps connectivity, power consumption, user experience, security, and device battery life." Feb. 2012, Version 0.14.122 pages.

Martin Sauter. "WirelessMoves: UMTS State Switching and Fast Dormancy Evolution." Jun. 16, 2010. Available online at: http://mobilesociety.typepad.com/mobile_life/2010/06/umts-state-switching-and-fast-dormancy-evolution.html, retrieved on Aug. 27, 2012. 5 pages.

Office Action dated Jun. 17, 2014 for U.S. Appl. No. 13/662,915, 20 pages.

* cited by examiner

CONTROLLING WIRELESS TRANSITION TIMERS BASED ON APPLICATION AND CONTENT

RELATED APPLICATION

This application is a continuation of, and claims priority to, U.S. application Ser. No. 13/662,915 (now U.S. Pat. No. 8,971,194), filed Oct. 29, 2012, and entitled "CONTROLLING WIRELESS TRANSITION TIMERS BASED ON APPLICATION AND CONTENT," the entirety of which is hereby incorporated herein by reference.

TECHNICAL FIELD

This disclosure relates generally to network communications, e.g., to controlling wireless transition timers based on application and content.

BACKGROUND

A wireless communication system can be utilized to provide wireless access to various communication services (e.g., voice, video, data, messaging, content broadcast, etc.) for users of the system. Wireless communication systems can operate according to a variety of network specifications and/or standards, such as, for example, Universal Mobile Telecommunications System (UMTS), Third Generation Partnership Project (3GPP) Long Term Evolution (LTE), High Speed Packet Access (HSPA). These specifications and/or standards use different modulation techniques, such as Code Division Multiple Access (CDMA), Time Division Multiple Access (TDMA), Frequency Division Multiple Access (FDMA), Multi-Carrier CDMA (MC-CDMA), Single-Carrier CDMA (SC-CDMA), Orthogonal Frequency Division Multiple Access (OFDMA), Single-Carrier Frequency Division Multiple Access (SC-FDMA), and so on.

Communication devices (e.g., wireless communication devices), such as mobile phones, electronic tablets, electronic gaming devices, and computers, are increasingly using applications to perform various functions and to communicate information between these communication devices and other communication devices (e.g., other mobile phones, electronic tablets, electronic gaming devices, computers, servers, etc.). An application can reside on a user's communication device, in a cloud, and/or on a server farm, for example.

The above-described description is merely intended to provide a contextual overview of wireless communication networks, and is not intended to be exhaustive.

DETAILED DESCRIPTION

Figure 1:
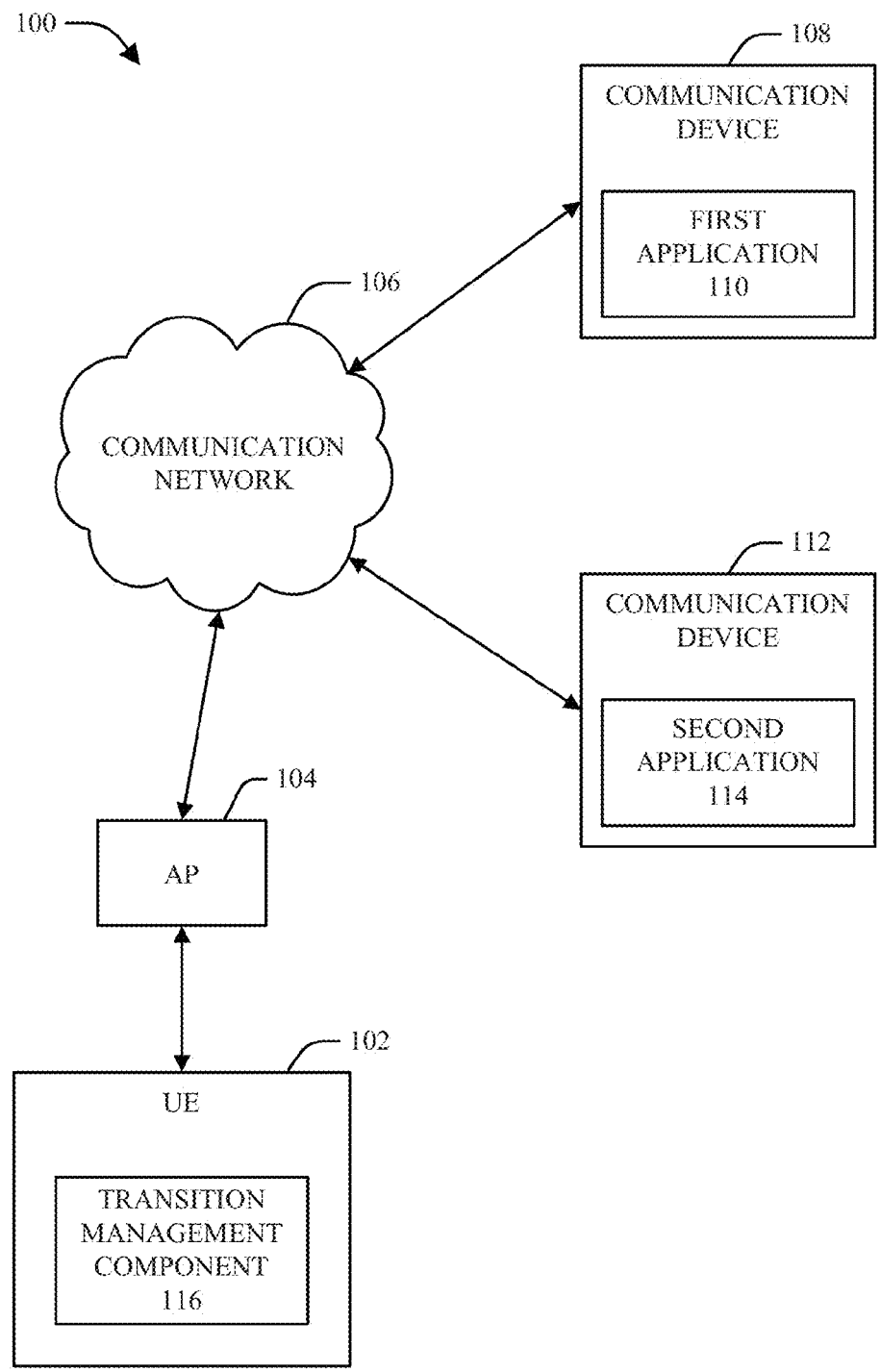
FIG. 1 illustrates a block diagram of an example system that can adaptively control wireless transition timers associated with wireless states in relation to use of applications by user equipment (UE) in a communication network, in accordance with various aspects and embodiments described herein.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Techniques for controlling transition of a communication device between wireless states are presented herein. The disclosed subject matter can include a method that can comprise identifying, by a system including a processor, a wireless transition timer based on information relating to activity of an application and a wireless communication device. The method also can include controlling, by the system, switching of the wireless communication device between a first wireless state and a second wireless state based on the wireless transition timer.

The disclosed subject matter also can include a system comprising a memory to store computer-executable instructions. The system also can include a processor, communicatively coupled to the memory, that facilitates execution of the computer-executable instructions to perform operations, comprising: determining a wireless transition timer based on information relating to activity of an application and a mobile communication device; and controlling transition of the mobile communication device between a first wireless state and a second wireless state based on the wireless transition timer.

Further, the disclosed subject matter can include a computer-readable storage device storing computer-executable instructions that, in response to execution, cause a system including a processor to perform operations. The operations can include identifying a wireless transition timer based on information relating to activity of an application and a mobile communication device; and controlling transitioning of the wireless communication device between a first wireless state and a second wireless state based on the wireless transition timer.

User equipment (UE) (e.g., wireless communication devices), such as mobile phones, electronic tablets, electronic gaming devices, and computers, can communicate with a communication network via a number of different types of communication channels having respective communication functionality and consuming respective amounts of power. There can be a subset of communication channels comprising different communication channels respectively associated with wireless states in a subset of available wireless states. For example, in accordance with a radio resource control (RRC) protocol (e.g., associated with UMTS), there can be four wireless states, including, e.g., an idle state, a dedicated-channel state, a forward-access-channel state, and a paging state, that can be respectively associated with a non-connection and three types of communication channels. In other implementations, there can be more or less than four wireless states and/or different wireless states, and/or there can be more or less than three types of communication channels, as well as the non-connection while in the idle state.

When the UE is in the idle state, there can be no communication connection between the UE and the communication network, wherein the idle state can be associated with the lowest energy consumption relative to the other wireless states. When the UE is in the dedicated-channel (DCH) state, there can be a dedicated communication connection (e.g., CELL_DCH) that can provide for faster data transfer speeds than the communication connections associated with the other wireless states, wherein the DCH state can be associated with the highest amount of energy consumption relative to the other wireless states. When the UE is in a forward-access-channel (FACH) state, there can be a forward-access channel (e.g., CELL_FACH) established between the UE and the communication network, wherein the forward access channel can be a common channel (as opposed to a dedicated channel) that can allow for uplink and downlink communication of data between the UE and the communication network at a lower transmission rate than that of the dedicated channel, and wherein the FACH state can be associated with a lower amount of energy consumption than that associated with the DCH state, but a higher amount of energy consumption than that associated with the other wireless states. When the UE is in the paging state (e.g., URA paging state), there can be a paging channel (URA_PCH) established between the UE and the communication network, wherein the paging channel can be a non-dedicated channel that can allow for downlink communication of data between the UE and the communication network at a lower transmission rate than that of the forward-access channel, and wherein the paging state can be associated with a lower amount of energy consumption than that associated with the FACH state, but a higher amount of energy consumption than that associated with the idle state.

UEs are increasingly using applications, including intelligent applications, to communicate information between these UEs and other communication devices (e.g., other mobile phones, electronic tablets, electronic gaming devices, computers, servers, etc.). An application can reside on a user's UE, in a cloud, and/or on a server farm, for example.

In wireless communication networks, management of wireless communication channels and states, network traffic, and network congestion can be desirable to facilitate efficient communication of traffic between UEs and other communication devices. The increased use of applications by UEs, increase in the amount of traffic being communicated in communication networks, increase in the volume of signaling in communication networks (e.g., by repeated communication between UEs and the network, and persistence or always-on communication connections associated with UEs), differences in the classifications and/or characteristics of applications, continuing evolution of applications, and various other factors can make management of wireless communication channels and states, network traffic, and network congestion increasingly more challenging and problematic for today's systems. Wireless state transition behavior, network behavior, and application behavior can be dependent on a number of factors, such as, for example, type of application, type of content being communicated, the number of active users, network congestion level, user behavior with regard to UEs and applications, and/or the demographics of the user environments, including UE capabilities and the presence of other active applications on the UEs.

For instance, streaming media (e.g., video content, audio content) or data file downloads (e.g., downloads of songs, programs, videos, movies, etc.) by a UE can involve communication of a relatively large amount of data over a relatively short amount of time, while other types of communications (e.g., retrieving a web page comprising textual data) by a UE can involve communication of a relatively smaller amount of data and/or intermittent communication over a particular period of time. As another example, applications designed to be able to communicate via a broadband network can present a higher risk or problem to the communication network (e.g., mobile or cellular communication network) than applications designed specifically for mobile or lower speed communication networks. However, many of these applications (e.g., applications designed for communication via a broadband network) may function at an acceptable level in lower energy states (e.g., lower energy states associated with a Third Generation (3G) network, which can comprise, for example, four wireless states), and these application can be serviced by the communication network with a same or similar quality of experience (QOE) while in a lower wireless state.

To that end, techniques for adaptively controlling wireless transition timers associated with wireless states in relation to use of applications by a UE are presented herein. A UE (e.g., mobile phones, electronic tablets, electronic gaming devices, computers, etc.) can include a transition management component that can adaptively control wireless transition timers associated with wireless states based at least in part on application type, session content, user behavior or activity in relation to the application or UE, or other factors. The transition management component can use the adapted wireless transition timers to control switching of the UE between a one wireless state (e.g., higher power wireless state) and another wireless state (e.g., a lower power wireless state) at desired (e.g., optimal, suitable, etc.) times to provide desired (e.g., optimal, enhanced, improved, etc.) performance. The transition management component can adapt wireless state transitions between different wireless states (e.g., Idle state, URA state, FACH state, DCH state, etc.) in accordance with the predictive usage (e.g., predictive wireless resource usage) of the application.

The transition management component can generate a mapping of an application's expected usage (e.g., predictive wireless resource usage) to lower-layer wireless state transitions (e.g., lower-layer Long-Term-Evolution (LTE) wireless state transitions). For instance, the transition management component can generate a mapping of wireless states and/or respectively associated wireless transition timers to application type, content type, user behavior or activity in relation to the application or UE, or other factors or parameters. The transition management component and its functions, features, and controls can operate on the UE to facilitate providing cross-layer enhancement (e.g., optimization) functions.

When a UE is using an application, the transition management component can monitor data flow associated with the application and track application data flow or behavior (e.g., changes in data flow or behavior), user behavior or activity, and/or other activity or parameters. The transition management component can analyze the tracked information to facilitate identifying desirable (e.g., improved, acceptable, efficient, optimal, etc.) wireless transition timers to use during a communication session and/or updating the mapping. For a current or subsequent communication session, the transition management component can control (e.g., dynamically or automatically control or adapt) the length of wireless transition timers (or selection of wireless transition timers of respective lengths) and switching between wireless states to enhance (e.g., improve, optimize, etc.) UE, application, and/or network performance while maintaining a desirable QOE for the user. The transition management component can maintain and access a timer look-up table (e.g., stored in a data store) that can include the mapping relating to wireless states and/or wireless transition timers. The transition management component can receive updates from the communication network or other sources, and/or can generate updates on its own (e.g., based on analysis of information relating to the tracking of application data flow or behavior, user behavior or activity, and/or other activity or parameters), to update (e.g., improve, optimize, etc.) the mapping and/or the wireless transition timers associated with the mapping.

After the transition management component identifies an application (e.g., identifies an application type) being used by the UE and/or changes in application behavior, the transition management component can access the timer look-up table, analyze the mapping, and identify a suitable (e.g., optimal, acceptable, etc.) wireless transition timer(s) to use while the UE is using the application, based at least in part on the type of application, type of content associated with the application, user behavior, and/or other factors or parameters. The transition management component can implement the identified wireless transition timer(s) to facilitate controlling switching of the UE between wireless states at desired (e.g., optimal, acceptable, etc.) times during use of the application to facilitate enhancing UE performance (e.g., reduce power consumption, reduce signaling with communication network, reduce use of radio resources, reduce use of processing resources, etc.) and/or communication network performance (e.g., improve use of radio resources, reduce signaling between the UE and communication network, more efficiently use radio resources, reduce or improve use of processing resources, etc.).

Certain types of applications can use always-on communication connections, wherein an application can send a keep-alive message periodically (e.g., every 5 seconds or 10 seconds) to the communication network to facilitate maintaining the always-on connection with the network. The transition management component can desirably (e.g., optimally, acceptably, efficiently, etc.) control signaling (e.g., sending of keep-alive messages) associated with an always-on connection, and/or activity reporting associated with a UE, between the UE and the communication network (e.g., cellular communication network) during a communication session and can desirably (e.g., optimally, acceptably, efficiently, etc.) control switching between wireless transition states using adapted wireless transition timers. This can desirably maintain the integrity of the always-on communication connection while also enhancing (e.g., improving, optimizing, reducing, etc.) use of network resources (e.g., radio resources, processing resources, etc.) and UE resources (e.g., power resources, radio resources, processing resources, etc.). In some implementations, to facilitate desirably controlling switching of the UE between wireless states during use of an application that utilizes an always-on communication connection between the UE and the communication network, the transition management component can modify a current policy (e.g., network or application policy) for keep-alive messages to an enhanced (e.g., improved) policy for keep-alive messages that can be tailored by the transition management component based at least in part on type of application, data flow and behavior associated with the application, type of content, user behavior in relation to the application or UE, and/or other factors. For instance, the transition management component can desirably adjust (e.g., dynamically or automatically adjust) a keep-alive policy or keep-alive emulation protocol associated with use of an application that would otherwise undesirably waste network and/or UE resources to an enhanced keep-alive policy or enhanced keep-alive emulation protocol to reduce or eliminate the wasting of network and/or UE resources in relation to use of the application. For example, if the transition management component determines, based at least in part on application data flow or behavior and/or user behavior or activity, that frequent sending (e.g., every 5 seconds) of keep-alive messages to the communication network is unnecessary and an inefficient use of resources, the transition management component can control the sending of keep-alive messages to the communication network to reduce the frequency of sending keep-alive messages (e.g., send every 2 minutes instead of every 5 seconds) to the communication network, while still maintaining the integrity of the always-on connection (e.g., while still providing a desirable (e.g., same or substantially the same) QOE to the user).

In some implementations, the transition management component also can desirably control switching of the UE between wireless transition states using the adapted wireless transition timers to facilitate desirably (e.g., optimally, acceptably, etc.) maintaining the performance of applications for communication connections (e.g., a push, session continuity, or persistence communication connections) between a UE and a wireless communication network (e.g., 3G, Fourth Generation (4G), Wi-Fi, etc.) during communication sessions (e.g., using WEB 2.0 push, session continuity, and/or persistence connections practices or protocols). The transition management component can receive (e.g., from the communication network) or generate a mapping of IP protocols to lower-layer wireless states based at least in part on type of application being used, application data flow or behavior, type of content associated with the application or communication session, user behavior in relation to the application or content, and/or other factors. The transition management component can use the mapping associated with the IP protocols to facilitate identifying or adapting wireless transition timers that can control switching the UE between wireless states in a manner that efficiently uses UE and/or network resources, while also maintaining desirable (e.g., acceptable, suitable, etc.) performance of the application (e.g., the user still has a desirable (e.g., same or substantially the same) QOE when using the application with the adapted wireless transition timers as the user would have had if the wireless transition timers had not been adapted or set by the transition management component).

For example, the transition management component can identify and apply a first subset of wireless transition timers associated with wireless states for a UE using a first type of application (e.g., a voice over IP (VoIP) application) during a first communication session. The transition management component also can identify and apply a second (e.g., different) subset of wireless transition timers associated with wireless states for the UE using a second type of application (e.g., video-streaming application, or a web browser application) during a second communication session, wherein the respective wireless transition times of the first subset of wireless transition timers and second subset of wireless transition timers can be enhanced (e.g., optimized, improved, etc.) by the transition management component to facilitate enhancing UE performance and/or communication network performance.

Referring now to the drawings, FIG. 1 illustrates a block diagram of an example system 100 that can adaptively control wireless transition timers associated with wireless states in relation to use of applications by a UE in a communication network, in accordance with various aspects and embodiments described herein. The system 100 can comprise a UE 102 (e.g., mobile and/or wireless communication device, such as a mobile phone (e.g., 3GPP Universal Mobile Telecommunications System (UMTS) phone), electronic notebook, electronic pad or tablet, electronic gaming device, personal digital assistant (PDA), computer, set-top box, etc.) that can operate and communicate in a communication network environment. In an aspect, the UE 102 can be communicatively connected via a wireless communication connection(s) via an access point (AP) 104 to a communication network(s) 106.

In an aspect, as the UE 102 is moved through a wireless communication network environment, at various times, the UE 102 can be connected (e.g., wirelessly connected) to one of a plurality of APs (e.g., macro or cellular AP, femto AP, pico AP, Wi-Fi AP, Wi-Max AP, hotspot (e.g., Hotspot 1.x, Hotspot 2.x, where x is an integer number; UE 102 functioning as a mobile hotspot; etc.), etc.), such as an AP 104, that can operate in the wireless communication network environment. An AP (e.g., 104) can serve a specified coverage area to facilitate communication by the UE 102 or other UEs in the wireless communication network environment. The AP 104 can serve a respective coverage cell (e.g., macrocell, femtocell, picocell, etc.) that can cover a respective specified area, and the AP 104 can service mobile wireless devices, such as UE 102, located in the respective area covered by the respective cell, where such coverage can be achieved via a wireless link (e.g., uplink (UL), downlink (DL)). When an attachment attempt is successful, the UE 102 can be served by the AP 104 and incoming voice and data traffic can be paged and routed to the UE 102 through the AP 104, and outgoing voice and data traffic from the UE 102 can be paged and routed through the AP 104 to other communication devices (e.g., another UE) in the communication network environment. In an aspect, the UE 102 can be connected and can communicate wirelessly using virtually any desired wireless technology, including, for example, cellular, Wi-Fi, Wi-Max, wireless local area networks (WLAN), etc.

In another aspect, the communication network 106 can facilitate wireless connection with the UE 102 connected to the AP 104 and facilitate communication by or between a UE 102 and another UE(s) or other type of communication device(s) (e.g., computer, server or server farm that can include an application server or content server that can be provide video content, audio content, and/or other content comprising other types of information, etc.), such as communication device 108 associated with a first application 110 and communication device 112 associated with a second application 114, wherein the communication device 108 and communication device 112 each can be associated with (e.g., communicatively connected to) the communication network 106 in the communication network environment.

An application being used by the UE 102 reside on the UE 102 or on a remote communication device (e.g., communication device 108, communication device 112), and/or can have functions that can be executed by the UE 102 and/or by another communication device (e.g., communication device 108, communication device 112) associated with the application (e.g., first application 110, second application 114). An application can be, for example, a mobile-to-mobile (M2M) type of application, a VoIP type of application, or a near real time (NRT) type of application, among other types of applications. In some implementations, the UE 102 can be connected (e.g., directly) with one or more applications (e.g., first application 110, second application 114) using, for example, one or more various types of wireless communication technology, such as near field communication (NFC) technology, Bluetooth technology, ZigBee technology, etc. In certain implementations, the UE 102 can function as a mobile hotspot (e.g., AP) to which one or more applications can be wirelessly connected to facilitate communication of traffic (e.g., voice or data traffic) between an application(s) 112 and the communication network 106 via the UE 102. It is to be further appreciated and understood that one or more communication devices (e.g., communication device 108, communication device 112) can be located within a cloud, wherein, for example, the cloud can include a server farm comprising one or more servers (e.g., application servers) that can be utilized to perform respective application functions (e.g., VoIP, video streaming, messaging, multimedia, electronic gaming, news-related functions, social media functions, finance-related functions, etc.) based at least in part on the type of application.

The communication network 106 can include one or more wireline networks and one or more wireless networks, wherein the one or more wireless networks can be based on one or more various types of communication technology or protocols, such as, for example, 3G, 4G, or x Generation (xG) network, where x can be virtually any desired integer or real value; Wi-Fi; etc. The communication network 106 (e.g., a core network, or a network comprising a core network and/or an IP-based network) can facilitate routing voice and data communications between a communication device(s) (e.g., UE 102) and other communication devices (e.g., another UE, communication device 108, communication device 112) associated with the communication network 106 in the communication network environment. The communication network 106 also can allocate resources to the UE 102 or other UEs in the communication network 106, convert or enforce protocols, establish and enforce Quality of Service (QoS) for the UEs (e.g., UE 102), provide applications or services in the communication network 106, translate signals, and/or perform other desired functions to facilitate system interoperability and communication in the communication network 106 (e.g., wireless portion of the communication network 106 or wireline portion of the communication network 106). The communication network 106 further can include desired components, such as routers, nodes, switches, interfaces, controllers, etc., that can facilitate communication of data between communication devices in the communication network environment.

In accordance with various implementations, the UE 102 can adaptively control wireless transition timers associated with wireless states in relation to use of an application(s) (e.g., first application 110, second application 114) by the UE 102 to facilitate efficiently controlling switching between wireless states by the UE 102. The UE 102 can include a transition management component 116 that can adaptively control wireless transition timers associated with wireless states based at least in part on a type of application, application data flow or behavior, session content (e.g., video content, audio content, textual content, etc.), user behavior or activity in relation to the application or UE 102, or other factors. For instance, the transition management component 116 can use the adapted wireless transition timers to control switching of the UE 102 between one wireless state (e.g., higher power wireless state) and another wireless state (e.g., a lower power wireless state) at desired (e.g., optimal) times to provide desired (e.g., optimal, enhanced, improved, etc.) performance by the UE 102 and/or the communication network 106. The transition management component 116 can adapt wireless state transitions between different wireless states (e.g., Idle state, URA state, FACH state, DCH state, etc.) in accordance with the predictive usage (e.g., predictive wireless resource usage) of the application (e.g., first application 110, second application 114). For example, a certain M2M application may have resource usage specifications such that the M2M application can be suitably serviced by using lower power wireless states, such as the FACH state or URA state without having to transition the UE 102 to the higher power DCH state. Based at least in part on this information (which can be reflected in the mapping relating to wireless state transitions), the transition management component 116 can control switching of the UE 102 and use of wireless transition timers to switch the UE 102 between the various lower power wireless states (e.g., FACH state, URA state, idle state) at desired times (e.g., in accordance with the adapted wireless transition timers) without transitioning the UE 102 to the higher power DCH state. It is to be appreciated and understood that, while the disclosed subject matter describes wireless states, such as DCH state, FACH state, URA state, and idle state, in accordance with various implementations, the disclosed subject matter can be used with various other types of wireless states associated with various other types of wireless (e.g., radio) state transition protocols.

The transition management component 116 can generate a mapping of an application's expected usage (e.g., predictive wireless resource usage) to lower-layer wireless state transitions (e.g., LTE wireless state transitions). For instance, the transition management component 116 can generate a mapping of wireless states and/or respectively associated wireless transition timers to type of application, data flow or behavior (e.g., changes in data flow or behavior) associated with the application, type of content, user behavior or activity in relation to the application or UE 102, or other factors or parameters. The transition management component 116 can use the mapping to facilitate identifying desired (e.g., adapted) wireless transition timers for use during a communication session involving the UE 102 and an application (e.g., first application 110 or second application 114), as more fully disclosed herein. The transition management component 116 and its functions, features, and controls can operate on the UE 102 to facilitate providing cross-layer enhancement (e.g., optimization) functions.

When the UE 102 is using an application (e.g., first application 110 or second application 114), the transition management component 116 can monitor, probe, and/or track data flow, behavior, and/or activity associated with the application (e.g., 110 or 114) or the user. The transition management component 116 can analyze the information relating to the tracked data flow, behavior, and/or activity associated with the application to facilitate identifying desirable (e.g., improved, acceptable, efficient, optimal, etc.) wireless transition timers to use during a communication session and/or to updating the mapping. With regard to updating of a mapping, the transition management component 116, by tracking data flow, behavior, and/or activity associated with the application or the user, can gain knowledge and learn about usage of the application, and can modify the mapping and adjust wireless transition timers, in accordance with applicable state-switching-control criterion (or corresponding rules).

For a current or subsequent communication session, based at least in part on the information analysis and the mapping, the transition management component 116 can control (e.g., dynamically or automatically control or adapt) the length of wireless transition timers (or selection of wireless transition timers of respective lengths) and switching between wireless states to enhance (e.g., improve, optimize, etc.) UE, application, and/or network performance, while maintaining a desirable QOE for the user of the UE 102. The transition management component 116 can generate, maintain, and/or access a timer look-up table (e.g., stored in a data store) that can include the mapping relating to wireless states and/or associated wireless transition timers. The transition management component 116 can receive updates from the communication network 106 or other sources (e.g., communication device 108, communication device 112), and/or can generate updates on its own (e.g., based at least in part on the analysis of tracked data flow, behavior, and/or activity associated with the application or user), to update the mapping and/or the wireless transition timers associated with the mapping. The transition management component 116 can therefore be programmable and adaptable to suitably respond to different types of applications, changes in application behavior or data flow, changes in user behavior or activity, etc.

After the transition management component 116 identifies an application (e.g., identifies an application type) being used by the UE, changes in application data flow or behavior, type of content associated with the communication session, etc., the transition management component 116 can access the timer look-up table, can analyze the mapping in relation to the application, and/or changes in application data flow or behavior, type of content associated with the communication session, etc. From the analysis of the mapping, the transition management component 116 can identify a suitable (e.g., optimal, acceptable, etc.) wireless transition timer(s) to use while the UE 102 is using the application (e.g., first application 110 or second application 114), based at least in part on the type of application (e.g., 110 or 114), data flow or behavior associated with an application, type of content associated with the application (e.g., 110 or 114), user behavior or activity (e.g., current, recent, or historical user behavior or activity) in relation to the application or UE 102, type of IP protocol, and/or other factors or parameters. The transition management component 116 can implement the identified wireless transition timer(s) to facilitate controlling switching of the UE 102 between wireless states (e.g., Idle state, URA state, FACH state, DCH state, etc.) at desired (e.g., optimal, acceptable, etc.) times during use of the application (e.g., 110 or 114) to facilitate enhancing UE performance (e.g., reduce power consumption, reduce signaling between the UE 102 and the communication network 106, reduce use of radio resources by or processing resources on the UE 102, etc.) and/or communication network performance (e.g., improve use of radio resources, reduce signaling between the UE 102 and communication network 106, reduce or improve use of processing resources, etc.).

For example, the transition management component 116 can identify and select a first wireless transition timer to use for a first wireless state based at least in part on the mapping and information relating to the type of application, application data flow or behavior, type of content associated with the application, user behavior or activity in relation to the application or UE 102, and/or other factors or parameters. While the UE 102 is in a first wireless state (e.g., DCH state), the transition management component 116 can monitor activity on the first communication connection or channel (e.g., Cell_DCH) and a first wireless transition timer can be used to facilitate to determining whether to transition the UE 102 from the first wireless state to a second wireless state (e.g., FACH state). If the transition management component 116 determines that there has been no activity or low activity on the first communication connection or channel for a period of time that indicates the amount of time of the first wireless transition timer has elapsed, the transition management component 116 can determine that the UE 102 is to be transitioned from the first wireless state to the second wireless state (e.g., FACH state). The transition management component 116 can transition the UE 102 from the first wireless state to the second wireless state, and the UE 102 can switch from the first communication connection or channel (e.g., Cell_DCH) to a second communication connection or channel (e.g., Cell_FACH).

In some implementations, based at least in part on an analysis or identification of an application (e.g., 110 or 114), application data flow or behavior, content, user behavior, etc., associated with a UE 102, the transition management component 116 can identify an instance(s) where a wireless transition timer may indicate that the wireless state for a UE is to transition from a first wireless state (e.g., a higher power wireless state, such as the DCH state) to a second wireless state (e.g., a relatively lower power wireless state, such as the FACH state or Idle state), but can have information that can indicate the UE 102 will be or is expected to be switched back to the first wireless state within a relatively short period of time that would render switching back and forth between the first wireless state and second wireless state by the UE 102 inefficient as compared to maintaining the UE 102 in the first wireless state. In such instance(s), the transition management component 116 can control the wireless transition timers and/or transition of the UE 102 between wireless states to maintain the UE 102 in the first wireless state, instead of switching the UE 102 from the first wireless state to the second wireless state and back to the first wireless state again.

Certain types of applications can use always-on communication connections, wherein an application can send a keep-alive message periodically (e.g., every 5 seconds or 10 seconds) to the communication network to facilitate maintaining the always-on connection between the UE 102 and the communication network 106. The transition management component 116 can desirably (e.g., optimally, acceptably, efficiently, etc.) control signaling (e.g., sending of keep-alive messages) associated with an always-on connection, and/or activity reporting associated with a UE 102, between the UE 102 and the communication network 106 (e.g., cellular communication network) during a communication session and can desirably (e.g., optimally, acceptably, efficiently, etc.) control switching between wireless transition states using adapted wireless transition timers. This can desirably maintain the integrity of the always-on communication connection while also enhancing (e.g., improving, optimizing, reducing, etc.) use of resources (e.g., radio resources, processing resources, etc.) of the communication network 106 and resources (e.g., power resources, radio resources, processing resources, etc.) of the UE 102. In some implementations, to facilitate desirably controlling switching of the UE between wireless states during use of an application that utilizes an always-on communication connection between the UE 102 and the communication network 106, the transition management component 116 can modify a current policy (e.g., network or application policy) for keep-alive messages to an enhanced policy for keep-alive messages that can be tailored by the transition management component 116 based at least in part on type of application (e.g., first application 110 or second application 114), data flow and behavior associated with the application, type of content, user behavior or activity in relation to the application (e.g., 110 or 114) or the UE 102, and/or other factors. For instance, the transition management component 116 can desirably adjust (e.g., dynamically or automatically adjust) a keep-alive policy or keep-alive emulation protocol associated with use of an application (e.g., 110 or 114) that would otherwise undesirably waste network and/or UE resources to an enhanced keep-alive policy or enhanced keep-alive emulation protocol to reduce or eliminate the wasting of network and/or UE resources in relation to use of the application (e.g., 110 or 114).

For example, the UE 102 can use an application (e.g., 110) that can be an email application that can use an always-on connection to maintain near real-time updates or receipts for email being sent to the UE 102 or associated UE user. The application (e.g., 110) can use a standard practice or protocol for maintaining the always-on connection between the UE 102 and the communication network 106 by transmitting a keep-alive message at a standard frequency (e.g., every 5 seconds). As a result of this standard practice or protocol, when the application is used by the UE 102, the sending of keep-alive messages at the standard frequency can result in the UE 102 always staying in the DCH state, which can cause the UE 102 to use a relatively significant amount of power, signaling (e.g., from the significant amount of sending of keep-alive messages), radio resources, and processing resources. Sending the keep-alive messages at the standard frequency may be acceptable if the UE user receives a lot of emails per hour and/or desires (e.g., needs) to be notified of newly received emails as soon as possible. However, sending the keep-alive messages at this standard frequency can be unacceptable and can result in an inefficient use of resources if the UE user does not receive a lot of emails per hour and/or does not desire (e.g., need) to be immediately notified of newly received emails.

The transition management component 116 can control signaling associated with the always-on connection and switching of the UE 102 between wireless states (e.g., using adapted wireless transition timers) to improve the efficiency of the UE 102 while using the application (e.g., 110), while maintaining the integrity of the always-on connection and performance of the application (e.g., while still providing a desirable (e.g., same or substantially the same) QOE to the user). For instance, the transition management component 116 can analyze data relating to tracked data flow, behavior, and/or activity associated with the application (e.g., 110) or the user. The transition management component 116 can identify that the user does not receive emails very frequently (e.g., approximately one email per hour on average) and the user does not check his emails that frequently (e.g., checks email every few hours on average). Based at least in part on the analysis results and applicable state-switching-control criterion (or corresponding rules), the transition management component 116 can determine that the frequent sending (e.g., every 5 seconds) of keep-alive messages to the communication network 106 in accordance with the standard practice or protocol is unnecessary and an inefficient use of resources. In response to that determination, the transition management component 116 can identify an enhanced practice, policy, or protocol that can modify (e.g., reduce) the frequency of sending of keep-alive messages from the UE 102 to the communication network 106 and identify desired wireless transition timers to control switching of the UE 102 to have the UE 102 switch to a lower power and lower resource using state (e.g., idle state) at desired times, and to switch up to the higher power, higher resource state (e.g., DCH state) at certain periodic times to facilitate receiving information relating to emails (e.g., email notifications, emails, etc.), instead of maintaining a constant always-on connection between the UE 102 and the communication network 106. For instance, in accordance with the enhanced practice, policy, or protocol, the transition management component 116 can control the sending of keep-alive messages from the UE 102 to the communication network 106 to reduce the frequency of sending keep-alive messages (e.g., to send a keep-alive message every 2 minutes instead of every 5 seconds) to the communication network 106, while still maintaining the integrity of the always-on connection (e.g., while still providing a desirable (e.g., same or substantially the same) QOE to the user). By reducing the frequency of sending keep-alive messages and employing the desired wireless transition timers, the transition management component 116 can more efficiently control switching of the UE 102 to a lower power and lower resource using state (e.g., idle state) at desired times to facilitate improving UE performance (e.g., reducing power consumption, reducing signaling between the UE 102 and the communication network 106, reducing use of radio resources by or processing resources on the UE 102, etc.) and/or communication network performance (e.g., improving use of radio resources, reducing signaling between the UE 102 and communication network 106, reducing or improving use of processing resources, increasing statistical gain, etc.).

In accordance with various implementations, the transition management component 116 can control the sending of keep-alive messages from the UE 102 to the communication network 106 by intercepting some of the keep-alive messages and placing the intercepted messages in a queue for controlled release to the communication network 106 in accordance with the modified frequency of the enhanced policy or discarding the intercepted messages, wherein the keep-alive messages that are not intercepted can be sent to the communication network 106 so that the frequency of message sending is in accordance with the modified frequency associated with the enhanced policy. In other implementations, where the application is an intelligent, adaptable, or programmable application, the transition management component 116 can send a notification or recommendation to the application (e.g., 110) to request or instruct the application to modify its standard policy for sending keep-alive messages to correspond to the enhanced policy and reduce the frequency of sending of keep-alive messages by the application.

In certain implementations, the transition management component 116 also can desirably (e.g., optimally, acceptably, etc.) control switching of the UE 102 between wireless transition states using wireless transition timers that can be adapted to facilitate desirably (e.g., optimally, acceptably, etc.) maintaining the performance of applications for communication connections (e.g., a push, session continuity, or persistence communication connections) between a UE 102 and a wireless communication network (e.g., 3G, 4G, Wi-Fi, etc.) during communication sessions (e.g., using WEB 2.0 push, session continuity, and/or persistence connections practices or protocols). The transition management component 116 can receive (e.g., from the communication network 106) or generate a mapping of IP protocols (e.g., transmission control protocol (TCP)/IP, user datagram protocol (UDP), stream control transmission protocol (SCTP), etc.) to lower-layer wireless states, wherein the mapping can be generated based at least in part on type of application (e.g., 110 or 114) being used, application data flow or behavior, type of content associated with the application (e.g., 110 or 114) or communication session, user behavior or activity in relation to the application (e.g., 110 or 114) or content, and/or other factors. The transition management component 116 can use the mapping associated with the IP protocols to facilitate identifying or adapting wireless transition timers that can control switching the UE 102 between wireless states in a manner that can more efficiently use resources of the UE 102 and/or resources of the communication network 106, while also maintaining desirable (e.g., acceptable, suitable, etc.) performance of the application (e.g., the user can still have a desirable (e.g., same or substantially the same) QOE when using the application with the adapted wireless transition timers as the user would have had if the wireless transition timers had not been adapted or set by the transition management component 116).

For example, the transition management component 116 can identify and apply a first subset of wireless transition timers associated with wireless states for a UE 102 using a first type of application (e.g., VoIP application, which, for example, can be the first application 110) during a first communication session, and identify and apply a second (e.g., different) subset of wireless transition timers associated with wireless states for the UE 102 using a second type of application (e.g., video-streaming application, or a web browser application, which, for example, can be the second application 114) during a second communication session, wherein the respective wireless transition times of the first subset of wireless transition timers and second subset of wireless transition timers can be respectively enhanced (e.g., optimized, improved, etc.) by the transition management component 116, based at least in part on the mapping, to facilitate enhancing performance of the UE 102 and/or performance of the communication network 106.

Figure 2:
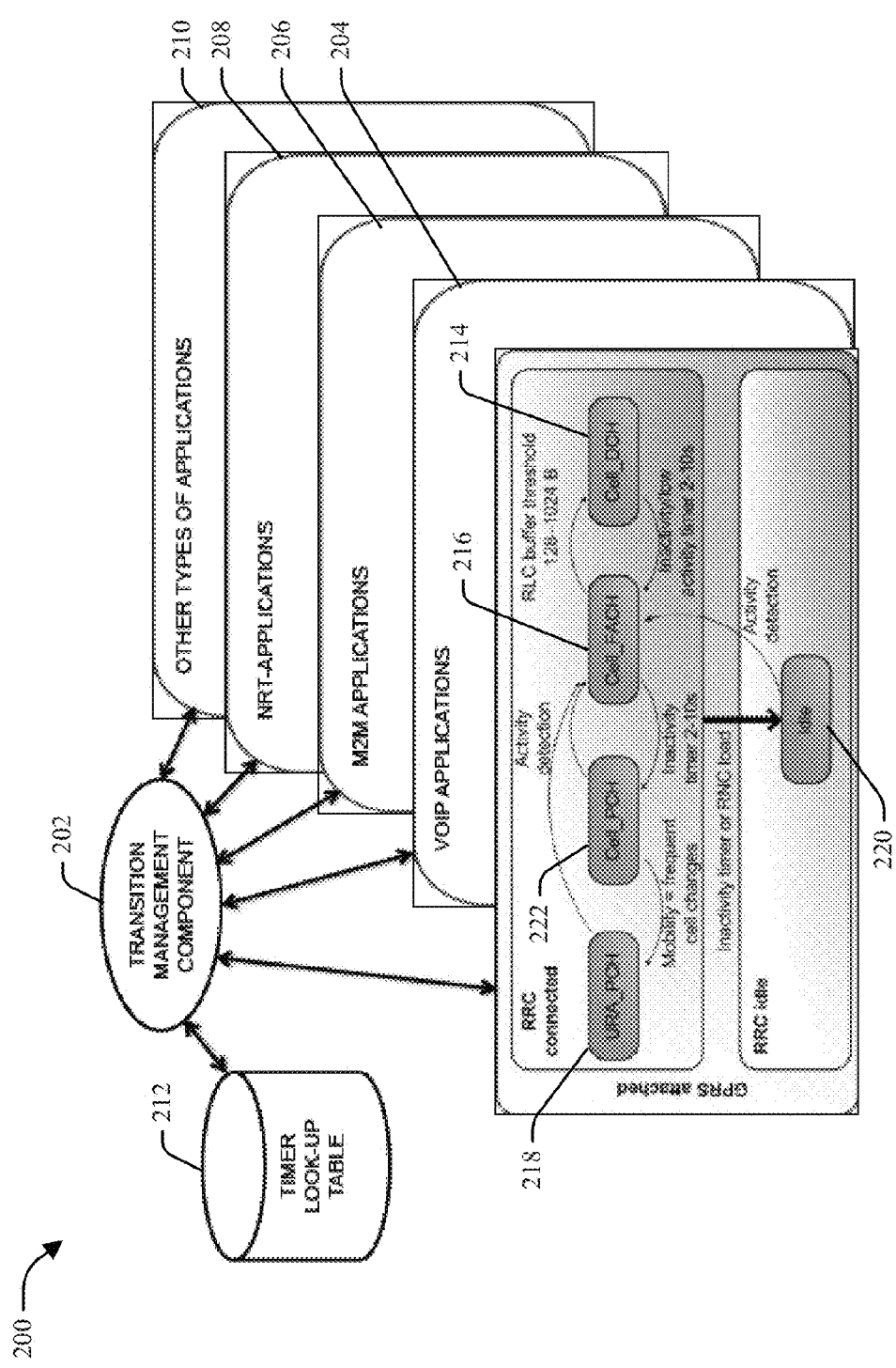
FIG. 2 depicts a block diagram of another example system that can adaptively control wireless transition timers associated with wireless states in relation to use of applications by a UE in a communication network, in accordance with various aspects and embodiments.

Referring briefly to FIG. 2 (along with FIG. 1), FIG. 2 depicts a diagram of an example system 200 that can adaptively control wireless transition timers associated with wireless states in relation to use of applications by a UE in a communication network, in accordance with various aspects and embodiments described herein. The system 200 can include a transition management component 202 that can adaptively control wireless transition timers associated with wireless states based at least in part on a type of application, changes in behavior or application data flow of the application, content (e.g., video content, audio content, textual content, etc.) associated with the communication session involving the application, user behavior or activity in relation to the application or the UE, or other factors. The transition management component 202 can be included in or associated with the UE.

The transition management component 202 can monitor or probe data flow associated with applications used by the UE. There can be various types of applications, such as, for example, VoIP applications 204, M2M applications 206, NRT applications 208, or other types of applications 210. The transition management component 202 can generate a mapping of wireless states and/or respectively associated wireless transition timers to type of application, application data flow or behavior, type of content associated with the application, user behavior or activity in relation to the application or UE, and/or other factors or parameters. The transition management component 202 can store that mapping in a timer look-up table 212. The wireless states can include, for example, a DCH state associated with Cell_DCH 214, a FACH state associated with Cell_FACH 216, a paging state that can be associated with URA_PCH 218, and an idle state associated with idle 220 (e.g., no communication connection). There also can be a separate wireless state associated with Cell_PCH 222.

For a current or subsequent communication session, the transition management component 202 can access that mapping from the timer look-up table and can utilize that mapping to facilitate controlling (e.g., dynamically or automatically controlling or adapting) the length of wireless transition timers (or selection of wireless transition timers of respective lengths) and switching between wireless states to enhance (e.g., improve, optimize, etc.) UE, application, and/or network performance while maintaining a desirable QOE for the user of the UE. For example, based at least in part on the mapping, the transition management component 202 can identify a first subset of wireless transition timers to use in relation to a first type of application (e.g., VoIP application 204) associated with a first type of content, and can use the first subset of wireless transition timers to control switching the UE between wireless states (e.g., DCH state, FACH state, paging state, and/or idle state) during the communication session involving the first type of application. Based at least in part on the mapping, the transition management component 202 also can identify a second subset of wireless transition timers to use in relation to a first type of application (e.g., M2M application 206) associated with a second type of content, and can use the second subset of wireless transition timers to control switching the UE between wireless states during the communication session involving the second type of application. Based at least in part on the respective application types, application data flow or behavior, content types, or other factors of the first type of application and second type of application, as specified in the mapping, the first subset of wireless transition timers can be different from the second subset of wireless transition timers.

It is to be appreciated and understood that FIG. 2 depicts example wireless transition times (e.g., 2-10 seconds (s)) and example buffer thresholds (e.g., RLC buffer threshold of 128-1024 bytes (B)), however, the disclosed subject matter is not so limited. For example, as disclosed herein, the transition management component (e.g., 202) can adapt or adjust wireless transition timers based at least in part on the type of application (e.g., VoIP application 204, M2M application 206, NRT application 208, etc.), data flow or behavior associated with an application, type of content associated with the application (e.g., 110 or 114), user behavior or activity (e.g., current, recent, or historical user behavior or activity) in relation to the application or UE, type of IP protocol, and/or other factors or parameters.

Figure 3:
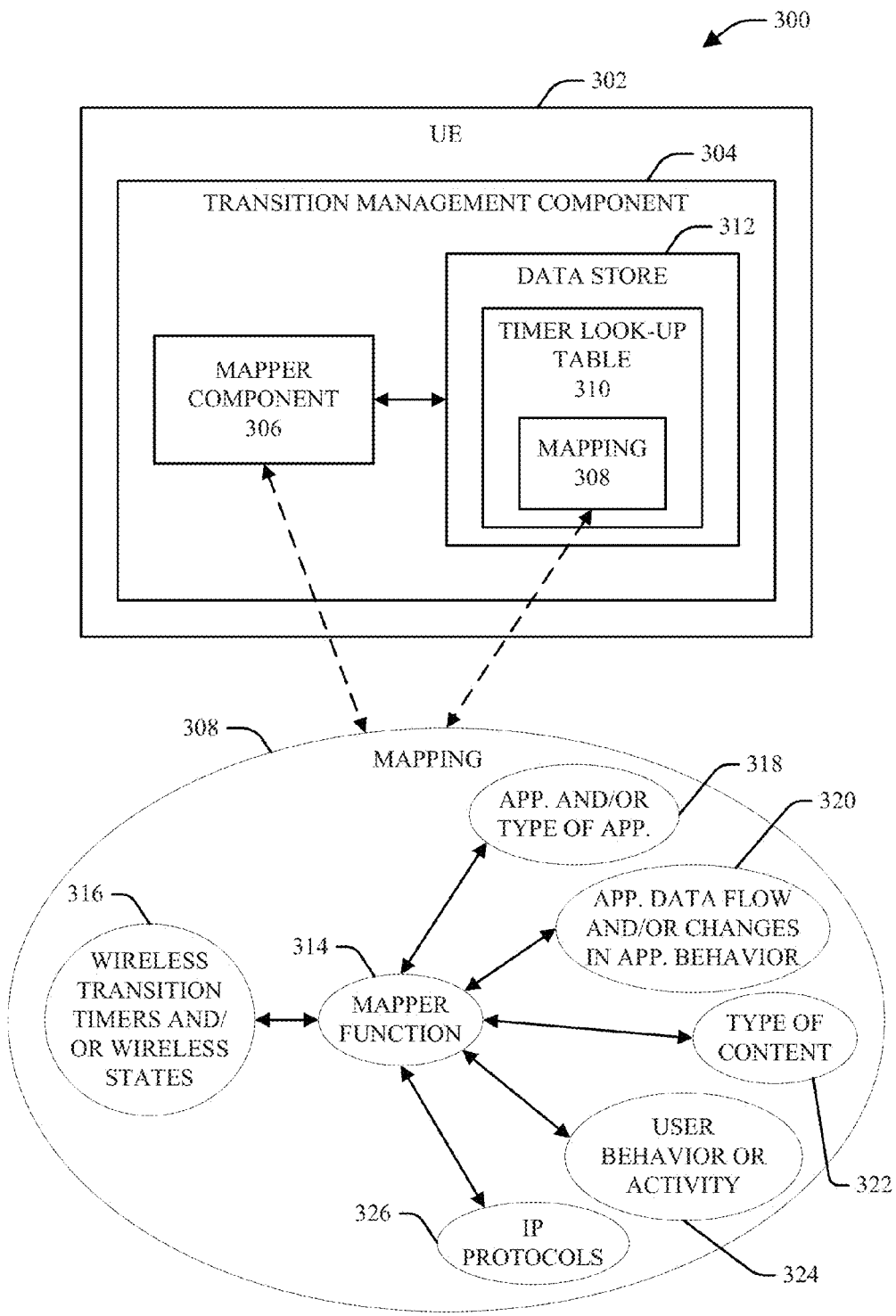
FIG. 3 illustrates a diagram of an example system that can be employed to generate a mapping that can facilitate adaptively controlling wireless transition timers associated with wireless states in relation to use of applications by a UE in a communication network, in accordance with various aspects and embodiments described herein.

FIG. 3 illustrates a diagram of an example system 300 that can be employed to generate a mapping that can facilitate adaptively controlling wireless transition timers associated with wireless states in relation to use of applications by a UE in a communication network, in accordance with various aspects and embodiments described herein. The system 300 can include a UE 302 that can be associated with a communication network (e.g., 106) via an AP (e.g., 104) in a wireless communication network environment. The UE 302 can use various applications (e.g., first application 110, second application 114, etc.) at various times.

The UE 302 can include a transition management component 304 that can adaptively control wireless transition timers associated with wireless states of the UE 302 based at least in part on a type of application, session content (e.g., video content, audio content, textual content, etc.), user behavior or activity in relation to the application or UE 302, and/or other factors.

When the UE 302 is using an application, the transition management component 304 can monitor data flow associated with the application and, for a current or subsequent communication session, can control (e.g., dynamically or automatically control or adapt) the length of wireless transition timers (or selection of wireless transition timers of respective lengths) and switching between wireless states (e.g., Idle state, URA state, FACH state, DCH state, etc.) to enhance (e.g., improve, optimize, etc.) UE, application, and/or network performance while maintaining a desirable QOE for the user of the UE 302. The transition management component 304 can include a mapper component 306 that can generate, maintain, and/or update a mapping 308 of an application's expected usage (e.g., predictive wireless resource usage) to lower-layer wireless state transitions (e.g., LTE wireless state transitions). For instance, the mapper component 306 can generate, maintain, and/or update the mapping 308 of wireless states and/or respectively associated wireless transition timers to type of application, application data flow or behavior, type of content, user behavior or activity in relation to the application or UE 302, type of IP protocol, or other factors or parameters. The mapper component 306 can store the mapping 308 in a timer look-up table 310, which can be stored in a data store 312.

The mapper component 306 can employ a desired mapper function 314 to facilitate generating the mapping 308 in accordance with one or more defined state-switching-control criterion and associated defined state-switching-control protocol (and/or corresponding state-switching-control rules) that can facilitate identification of desired wireless transition timers that can be used to adaptively control switching of the UE 302 between wireless states when using an application(s). The mapper component 306, using the mapper function 314, can generate, maintain, or update a mapping between the wireless transition timers and/or wireless states 316 and application (e.g., name of application) and/or type of application 318, application (app.) data flow and/or changes in application behavior 320, type of content 322, information associated with user behavior or activity in relation to an application or UE 302 and/or a user profile 324, IP protocols 326 (e.g., associated with an IP-based communication network), and/or other factors or parameters.

Figure 4:
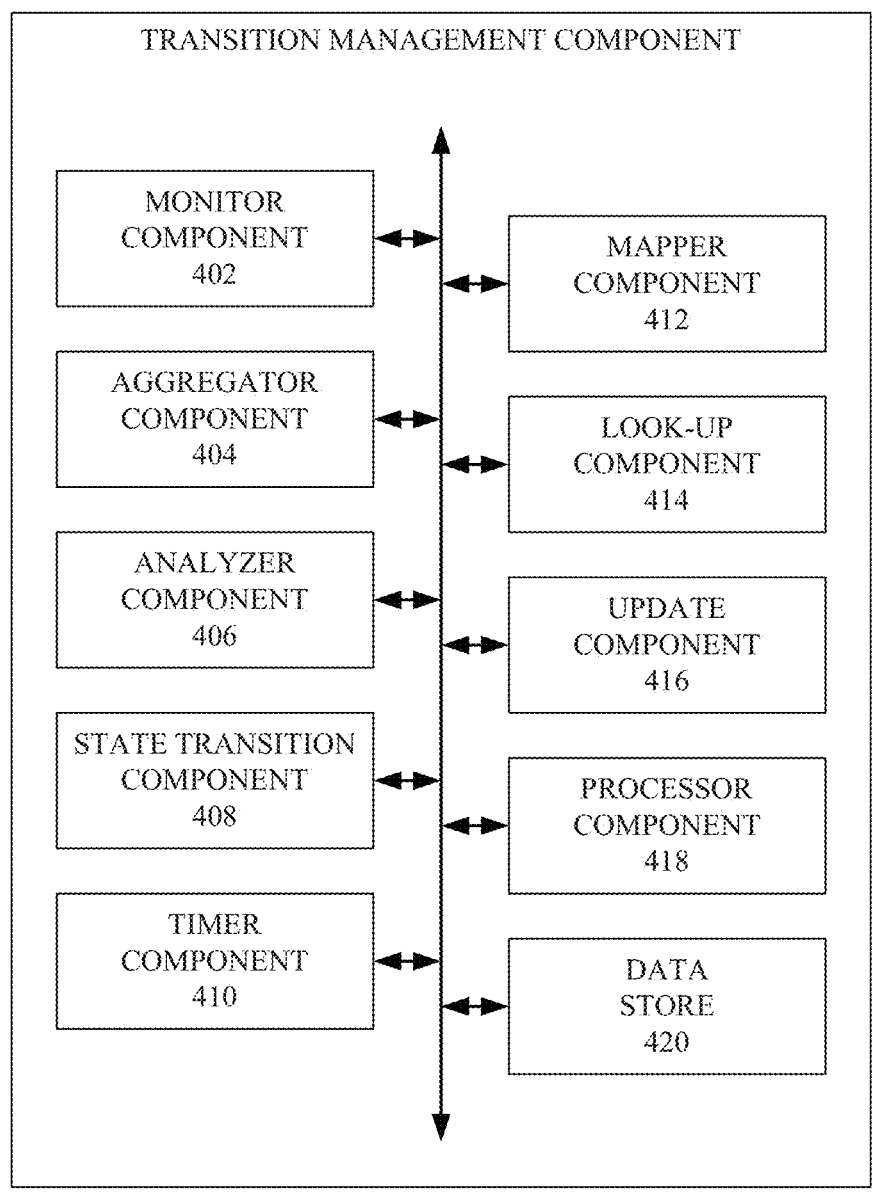
FIG. 4 depicts a block diagram of an example transition management component in accordance with various aspects and embodiments of the disclosed subject matter.

FIG. 4 depicts a block diagram of an example transition management component 400 in accordance with various aspects and embodiments of the disclosed subject matter. The transition management component 400 can be employed by a UE to facilitate adaptively controlling wireless transition timers associated with wireless states in relation to use of applications by the UE in a communication network, in accordance with various aspects and embodiments described herein.

The transition management component 400 can comprise a monitor component 402 that can monitor or probe the behavior of the application data flow associated with the application during a communication session involving the UE and the application. The monitor component 402 also can monitor wireless state transitions in relation to use of the application to facilitate enhancing the timing of wireless state transitions during the current or a subsequent communication session involving the UE and the application.

The transition management component 400 can include an aggregator component 404 that can aggregate data received (e.g., obtained) from various entities (e.g., monitor component 402 or another component(s) of the transition management component 400, communication network, application, a server or other communication device, processor, data store, etc.). The aggregator component 404 can correlate respective items of data based at least in part on type of data (e.g., video content, audio content, textual data, metadata, etc.), application to which the data relates, source of the data, time or date the data was generated or received, etc., to facilitate analyzing of the data by the analyzer component 406. For example, the aggregator component 404 can aggregate data relating to an application and/or other data (e.g., data relating to the communication network) to facilitate generating a mapping between wireless transition timers (and/or wireless states) and type of application, type of content, user behavior or activity in relation to the application or UE, and/or other factors or parameters.

The transition management component 400 can include the analyzer component 406, which can analyze data to facilitate identifying a type of application, identifying a type of content, identifying application behavior, identifying user behavior, identifying a suitable wireless transition timer to be implemented during a communication session that involves the UE and the application, identifying a suitable wireless state for the UE to be in at a given time, generating a mapping relating to wireless transition timers and wireless states, etc., and can generate analysis results, based at least in part on the data analysis. For example, the analyzer component 406 can analyze information relating to the type of application, type of content associated with the application, user behavior or activity in relation to the application or UE, and/or the mapping related to the wireless transition timers and wireless states, and can generate analysis results that can facilitate identifying a subset of wireless transition timers to use during a communication session involving the UE and the application and/or identifying a wireless state that the UE is to be in at a given time during the communication session.

The transition management component 400 also can comprise a state transition component 408 that can identify a wireless state the UE is to be in at a given time, and can control selecting or setting of wireless transition timers and transitioning the UE between various available wireless states (e.g., Idle state, URA state, FACH state, DCH state, etc.) at respective times, based at least in part on the mapping relating to wireless transition timers and wireless states, wherein the mapping can be generated (e.g., by the mapper component 412) based at least in part the type of application, application data flow or behavior, type of content associated with the application, user behavior or activity in relation to the application or UE, type of IP protocol, and/or other factors or parameters, in accordance with one or more defined state-switching-control criterion and associated defined state-switching-control protocol (and/or corresponding state-switching-control rules). The state transition component 408 can receive analysis results from the analyzer component 406 to facilitate making decisions or determinations regarding wireless state transitions and/or selection or setting of wireless transition timers for switching the UE between wireless states. The state transition component 408 also can control signaling between the UE and the communication network to facilitate transition of the UE between different wireless states.

The transition management component 400 can include a timer component 410 that can track an amount of time that has elapsed in relation to a wireless transition timer being utilized by the transition management component 400 at a given time. The timer component 410 can signal the state transition component 408 when the amount of time associated with a wireless transition timer has elapsed to facilitate state transition by the state transition component 408 from one wireless state to another wireless state.

The transition management component 400 can comprise a mapper component 412 that can facilitate generating, maintaining, and/or updating a mapping of wireless states and/or respectively associated wireless transition timers to a type of application, application data flow or behavior, type of content, user behavior or activity in relation to the application or the UE, type of IP protocol, or other factors or parameters. The mapper component 412 can store the mapping in a timer look-up table that can be generated or maintained by a look-up component 414, wherein the timer look-up table can be stored in a data store 420. The transition management component 400 can contain an update component 416 that can receive updates (e.g., information updates) relating to modifications to wireless transition timers, changes in application data flow, changes in user activity or behavior in relation to an application or the UE, modification of a defined state-switching-control criterion, modification of a defined state-switching-control protocol, modification of a state-switching-control rule, etc. The mapper component 412 and update component 416 can operate to facilitate updating of the mapping relating to wireless states and/or respectively associated wireless transition timers based at least in part on the updates, wherein the updated mapping can be saved to the timer look-up table, which can be stored in the data store 420.

The transition management component 400 can comprise a processor component 418 that can work in conjunction with the other components (e.g., monitor component 402, aggregator component 404, analyzer component 406, etc.) to facilitate performing the various functions of the transition management component 400. The processor component 418 can employ one or more processors, microprocessors, or controllers that can process data, such as information relating to applications, users, wireless transition timers, wireless states, a mapping, mapper function, defined state-switching-control criterion, a defined state-switching-control protocol, state-switching-control rules, and/or other information, to facilitate operation of the transition management component 400, as more fully disclosed herein, and control data flow between the transition management component 400 and other components (e.g., communication network, base station, an application, a server or other communication device, a cloud, etc.) associated with the transition management component 400.

The transition management component 400 also can include a data store 420 that can store data structures (e.g., user data, metadata), code structure(s) (e.g., modules, objects, hashes, classes, procedures) or instructions, information relating to applications, users, wireless transition timers, wireless states, a mapping, mapper function, defined state-switching-control criterion, a defined state-switching-control protocol state-switching-control rules, and/or other information, to facilitate controlling operations associated with the transition management component 400. In an aspect, the processor component 418 can be functionally coupled (e.g., through a memory bus) to the data store 420 in order to store and retrieve information desired to operate and/or confer functionality, at least in part, to the monitor component 402, aggregator component 404, analyzer component 406, etc., and/or substantially any other operational aspects of the transition management component 400.

Figure 5:
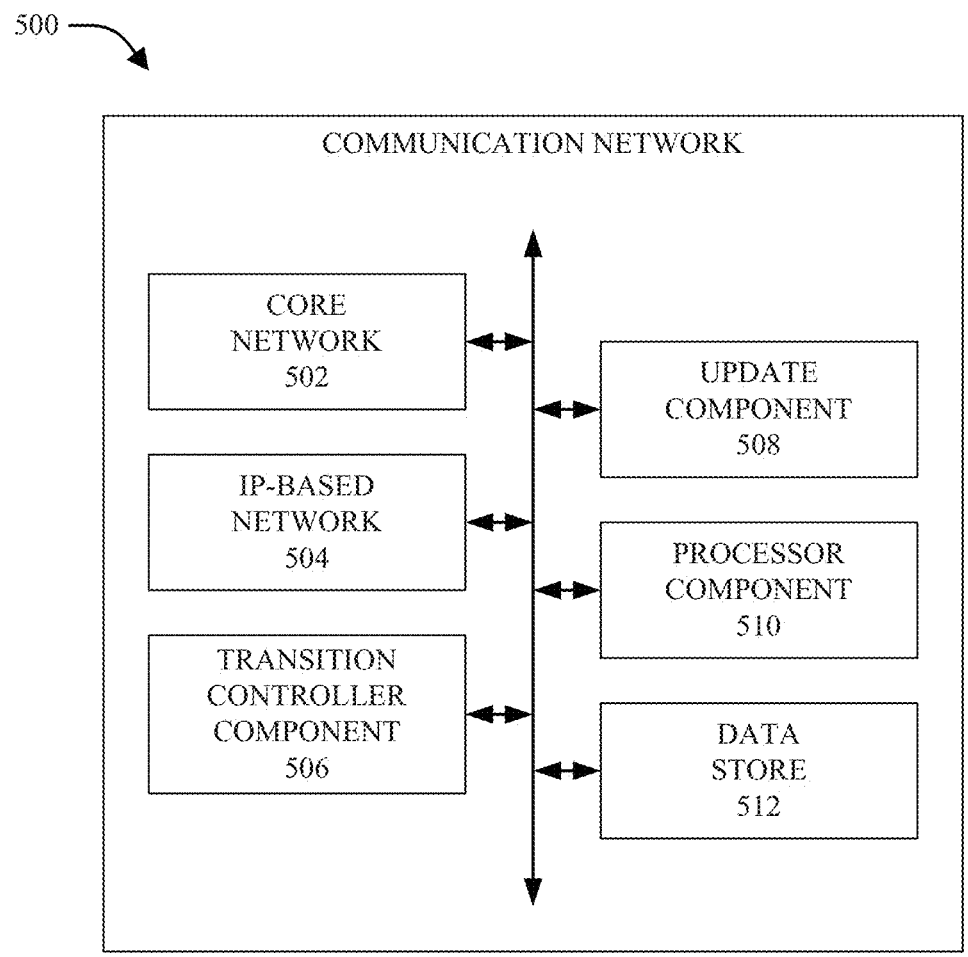
FIG. 5 presents a block diagram of an example communication network in accordance with various aspects and embodiments of the disclosed subject matter.

FIG. 5 illustrates a block diagram of an example communication network 500 in accordance with various aspects and embodiments of the disclosed subject matter. The communication network 500 can include a core network 502 (e.g., mobile core network) that can facilitate communications by UEs wirelessly connected to the communication network 500. A UE can be communicatively connected to the core network 502 via an AP (e.g., base station). The core network 502 can facilitate wireless communication of voice and data associated with communication devices, such as UEs, associated with the communication network 500. The core network 502 can facilitate routing voice and data communications between UEs and/or other communication devices (e.g., phone, computer, email server, multimedia server, audio server, video server, news server, financial or stock information server, other communication devices associated with an IP-based network 504 (e.g., the Internet), etc.) associated with the communication network 500. The core network 502 also can allocate resources to the UEs associated with the communication network 500 in the communication network environment, convert or enforce protocols, establish and enforce QoS for the UEs, provide applications or services in the network, translate signals, and/or perform other desired functions to facilitate system interoperability and communication in the wireless communication network. The core network 502 further can include desired components, such as routers, nodes (e.g., general packet radio service (GPRS) nodes, such as serving GPRS support node (SGSN), gateway GPRS support node (GGSN), etc.), switches, interfaces, controllers, etc., that can facilitate communication of data between communication devices associated with the communication network 500.

The communication network 500 can include the IP-based network 504, which can facilitate communications by communication devices (e.g., UEs) that are connected to the communication network 500 via a wireless connection, or a wireline or landline connection. For example, a UE can be communicatively connected to the IP-based network 504 via a wireless communication connection with the core network 502, wherein the UE can communicate with other communication devices connected to the communication network 500. A UE can transmit messages, use applications, access or download content, etc., via the core network 502 and/or the IP-based network 504, or another communication network (not shown).

The communication network 500 can contain a transition controller component 506 that can communicate (e.g., signal) with a UE to facilitate the transition of the UE from one wireless state (e.g., DCH state) to another wireless state (e.g., FACH state, Idle state, etc.). The transition controller component 506 also can track, and analyze information relating to, resource usage by the communication network 500, particularly the core network 502, in relation to servicing the UE or other UEs, wireless state transitions associated with the UE or other UEs, wireless transition timers, user behavior or activity, application behavior or activity, and/or other factors, to facilitate adjusting wireless transition timers and/or controlling wireless state transitions for the UE and other UEs to enhance the efficiency of UEs and the communication network. The transition controller component 506 can operate in conjunction with an update component 508 to facilitate updating information relating to wireless transition timers, wireless states, etc., for a UE. The update component 508 can facilitate transmitting an update of information relating to wireless transition timers, wireless states, an associated mapping, etc., to a UE to update a timer look-up table associated with the UE to facilitate modifying wireless transition timers, wireless transitions, and/or an associated mapping, etc., in relation to an application(s) used by the UE.

The communication network 500 also can include a processor component 510 that can work in conjunction with (and/or be part of) the other components (e.g., core network 502, 1P-based network 504, transition controller component 506, etc.) to facilitate performing the various functions of the communication network 500. The processor component 510 can employ one or more processors, microprocessors, or controllers that can process data, such as information relating to wireless or wireline communications, applications, users, wireless transition timers, wireless states, a mapping, a mapper function, defined state-switching-control criterion, a defined state-switching-control protocol, state-switching-control rules, and/or other information, to facilitate operation of the communication network 500, as more fully disclosed herein, and control data flow between the communication network 500 and other components (e.g., UE, base station, an application, a server or other communication device, a cloud, etc.) associated with the communication network 500.

The communication network 500 also can include a data store 512 that can store data structures (e.g., user data, metadata), code structure(s) (e.g., modules, objects, hashes, classes, procedures) or instructions, information relating to wireless or wireline communications, applications, users, wireless transition timers, wireless states, a mapping, a mapper function, defined state-switching-control criterion, a defined state-switching-control protocol state-switching-control rules, and/or other information, to facilitate controlling operations associated with the communication network 500. In an aspect, the processor component 510 can be functionally coupled (e.g., through a memory bus) to the data store 512 in order to store and retrieve information desired to operate and/or confer functionality, at least in part, to the core network 502, IP-based network 504, transition controller component 506, etc., and/or substantially any other operational aspects of the communication network 500.

Figure 6:
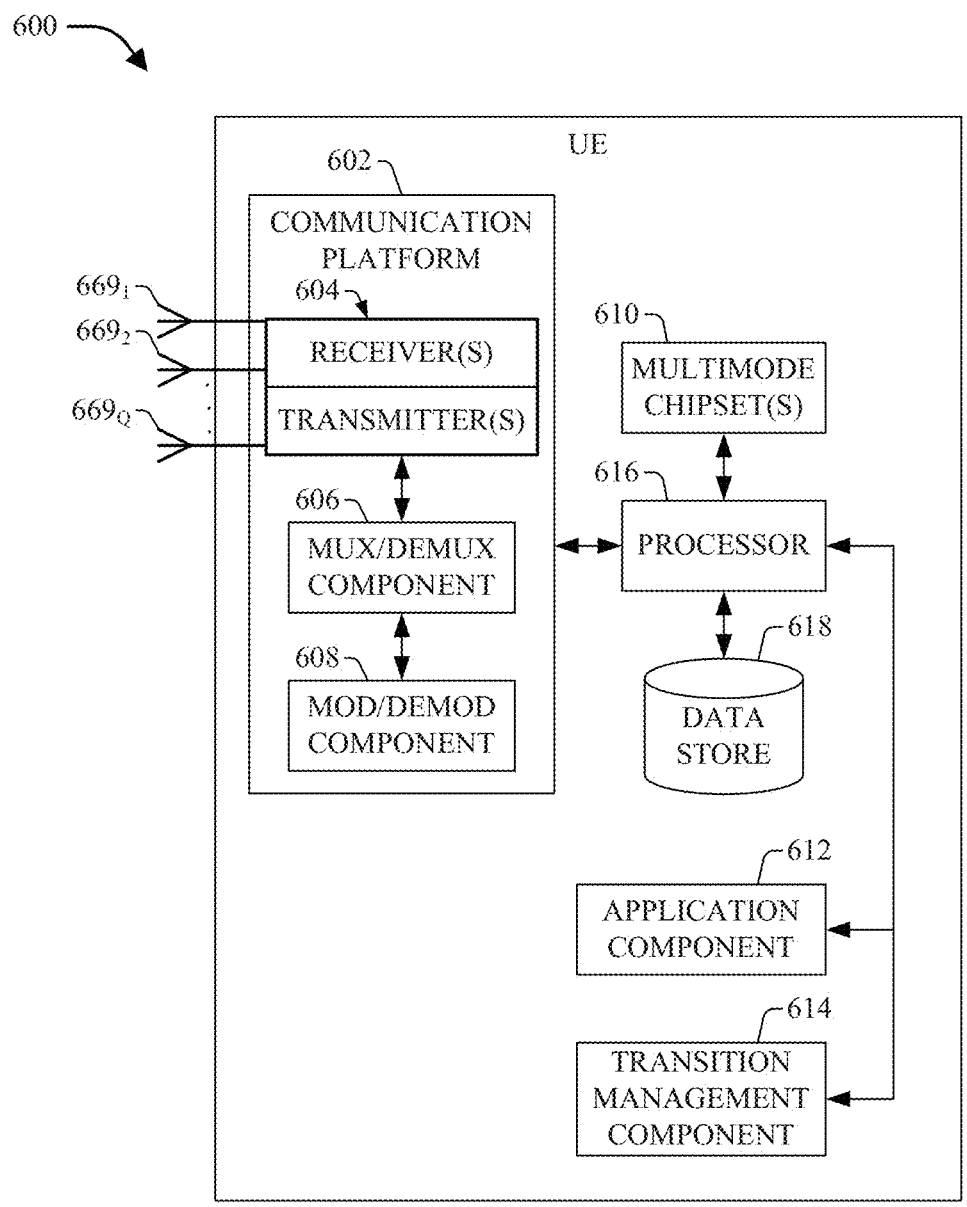
FIG. 6 depicts a block diagram of an example UE in accordance with an aspect of the disclosed subject matter.

FIG. 6 depicts a block diagram of an example UE 600 in accordance with an aspect of the disclosed subject matter. In an aspect, the UE 600 can be a multimode access terminal, wherein a set of antennas $669_1$-$669_Q$ (Q is a positive integer) can receive and transmit signal(s) from and to wireless devices like access points, access terminals, wireless ports and routers, and so forth, that operate in a radio access network. It should be appreciated that antennas $669_1$-$669_Q$ can be part of the communication platform 602, which can comprise electronic components and associated circuitry that can provide for processing and manipulation of received signal(s) and signal(s) to be transmitted, e.g., by receivers and transmitters 604, multiplexer/demultiplexer (mux/demux) component 606, and modulation/demodulation (mod/demod) component 608.

In another aspect, the UE 600 can include a multimode operation chipset(s) 610 that can allow the UE 600 to operate in multiple communication modes in accordance with disparate technical specification for wireless technologies. In an aspect, multimode operation chipset(s) 610 can utilize communication platform 602 in accordance with a specific mode of operation (e.g., voice, GPS). In another aspect, multimode operation chipset(s) 610 can be scheduled to operate concurrently (e.g., when Q>1) in various modes or within a multi-task paradigm.

In some implementations, the UE 600 can comprise an application component 612 that can include one or more applications or can facilitate using one or more applications. In accordance with various implementations, all or a portion of an application or that application's functionality can reside on the UE 600 and/or all or a portion of that application or its functionality can reside on another device (e.g., another communication device, a communication device located in or associated with a cloud, etc.) associated with the communication network.

In certain implementations, the UE 600 can include a transition management component 614 that can perform various functions and operations to facilitate controlling setting or selecting of wireless transition timers, switching of the UE 600 between wireless states, etc. As more fully disclosed herein, the transition management component 614 can identify a wireless state the UE 600 is to be in at a given time, and can control selecting or setting of wireless transition timers and transitioning the UE 600 between various available wireless states (e.g., Idle state, URA state, FACH state, DCH state, etc.) at respective times, based at least in part on the mapping relating to wireless transition timers and wireless states, in accordance with one or more defined state-switching-control criterion and associated defined state-switching-control protocol (and/or corresponding state-switching-control rules).

In still another aspect, the UE 600 also can include a processor(s) 616 that can be configured to confer functionality, at least in part, to substantially any electronic component within the UE 600, in accordance with aspects of the disclosed subject matter. The processor(s) 616 can facilitate enabling the UE 600 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. The processor(s) 616 also can facilitate enabling the UE 600 to process data relating to messaging, voice calls, applications, services (e.g., Internet services or access, services related to applications, etc.), wireless transition timers, wireless states, a mapping, a mapper function, a timer look-up table, defined state-switching-control criterion, a defined state-switching-control protocol, state-switching-control rules, etc. In accordance with various implementations, the processor(s) can facilitate identifying a wireless state the UE is to be in at a given time, and can facilitate controlling selecting or setting of wireless transition timers and/or transitioning the UE 600 between various available wireless states (e.g., Idle state, URA state, FACH state, DCH state, etc.) at respective times.

The UE 600 also can contain a data store 618 that can store data structures (e.g., user data, metadata); code structures (e.g., modules, objects, classes, procedures) or instructions; message hashes; information relating to applications, wireless transition timers, wireless states, a mapping, mapper function, a timer look-up table, defined state-switching-control criterion, a defined state-switching-control protocol, state-switching-control rules, and/or other information; user policies; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; etc. In an aspect, the processor(s) 616 can be functionally coupled (e.g., through a memory bus) to the data store 618 in order to store and retrieve information (e.g., data structures; code structures; instructions; algorithms; information relating to applications, wireless transition timers, wireless states, a mapping, a mapper function, a timer-look-up table, defined state-switching-control criterion, a defined state-switching-control protocol, state-switching-control rules, and/or other information; etc.) desired to operate and/or confer functionality, at least in part, to the communication platform 602, multimode operation chipset(s) 610, application(s) 612, transition management component 614, and/or substantially any other operational aspects of the UE 600.

Figure 7:
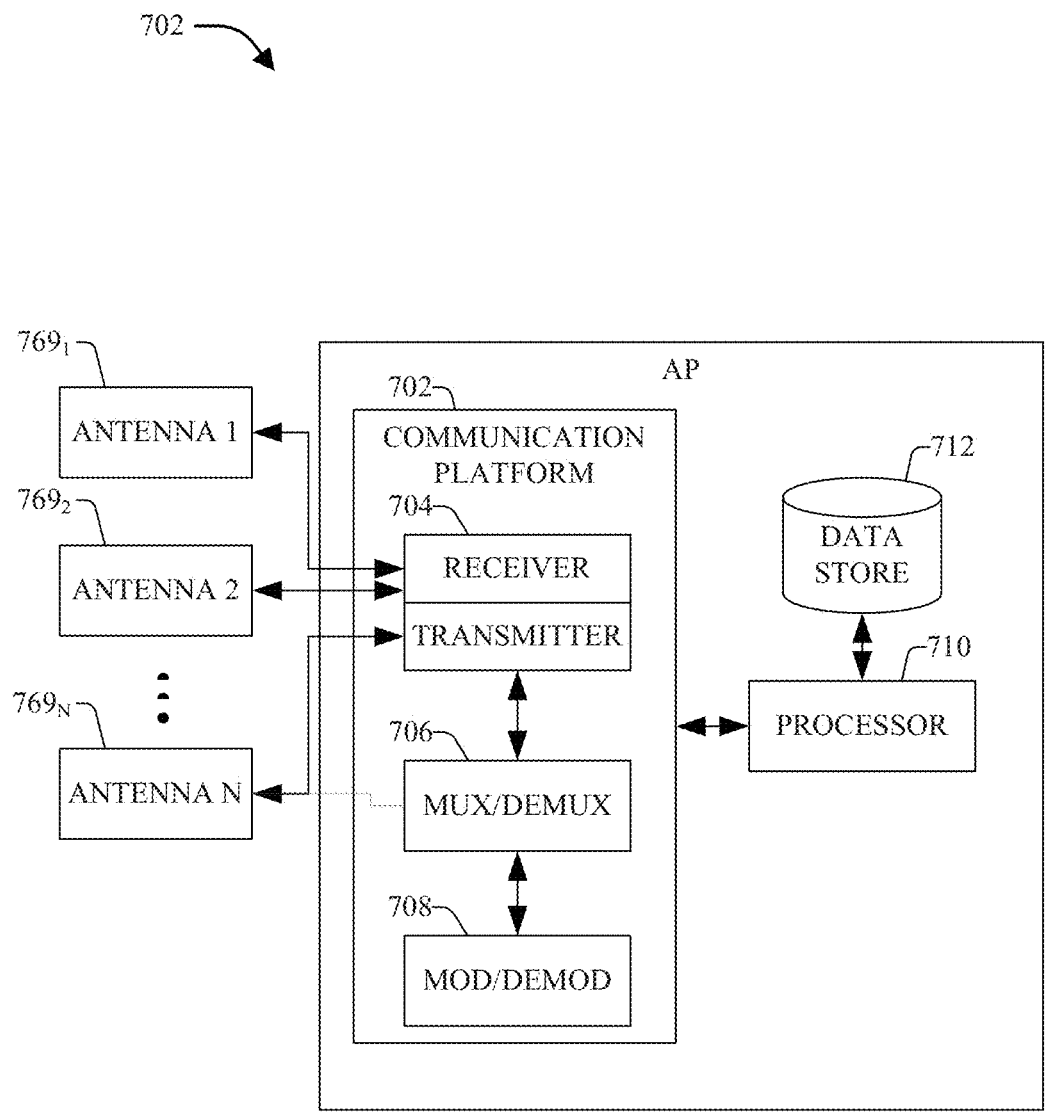
FIG. 7 illustrates a block diagram of an example access point in accordance with an aspect of the disclosed subject matter.

FIG. 7 illustrates a block diagram of an example AP 700 (e.g., femtocell, picocell, macro base station, etc.) in accordance with an aspect of the disclosed subject matter. The AP 700 can receive and transmit signal(s) from and to wireless devices like access points (e.g., femtocells, picocells, base stations, etc.), access terminals (e.g., UEs), wireless ports and routers, and the like, through a set of antennas $769_1$-$769_N$. In an aspect, the antennas $769_1$-$769_N$ are a part of a communication platform 702, which comprises electronic components and associated circuitry that can provide for processing and manipulation of received signal(s) and signal(s) to be transmitted. In an aspect, the communication platform 702 can include a receiver/transmitter 704 that can convert signal from analog to digital upon reception, and from digital to analog upon transmission. In addition, receiver/transmitter 704 can divide a single data stream into multiple, parallel data streams, or perform the reciprocal operation.

In an aspect, coupled to receiver/transmitter 704 can be a multiplexer/demultiplexer (mux/demux) 706 that can facilitate manipulation of signal in time and frequency space. The mux/demux 706 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 706 can scramble and spread information (e.g., codes) according to substantially any code known in the art, e.g., Hadamard-Walsh codes, Baker codes, Kasami codes, polyphase codes, and so on. A modulator/demodulator (mod/demod) 708 also can be part of the communication platform 702, and can modulate information according to multiple modulation techniques, such as frequency modulation, amplitude modulation (e.g., M-ary quadrature amplitude modulation (QAM), with M a positive integer), phase-shift keying (PSK), and the like.

The AP 700 also can comprise a processor(s) 710 that can be configured to confer and/or facilitate providing functionality, at least partially, to substantially any electronic component in or associated with the AP 700. For instance, the processor(s) 710 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc., to facilitate between an associated UE and the communication network.

In another aspect, the AP 700 can include a data store 712 that can store data structures; code instructions; rate coding information; information relating to measurement of radio link quality or reception of information related thereto; information relating to establishing a communications connection between a communication device (e.g., UE) and other communication devices; system or device information like policies and specifications; code sequences for scrambling; spreading and pilot transmission; floor plan configuration; access point deployment and frequency plans; scheduling policies; and so on. The processor(s) 710 can be coupled to the data store 712 in order to store and retrieve information (e.g., information relating to multiplexing/demultiplexing or modulation/demodulation, information relating to radio link levels, information relating to establishing communication connections associated with a UE(s) served by the AP 700, etc.) desired to operate and/or confer functionality to the communication platform 702, and/or other operational components of AP 700.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 8-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 8:
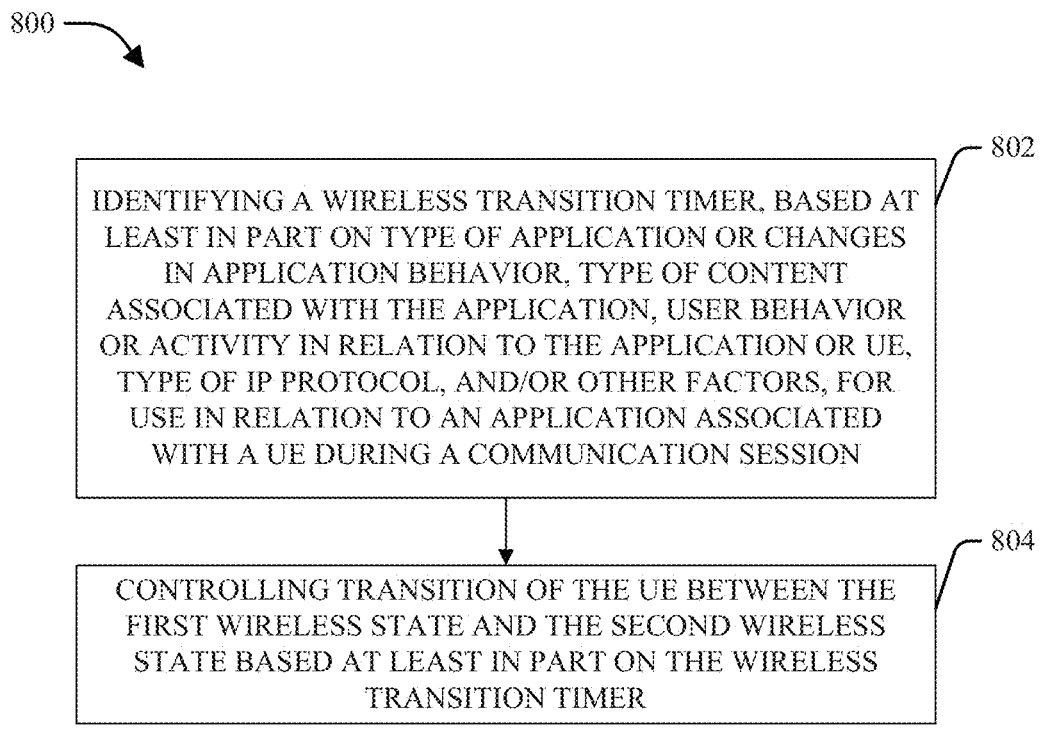
FIG. 8 illustrates a flow diagram of an example method for adaptively controlling wireless transition timers associated with wireless states in relation to use of applications by a UE in a communication network, in accordance with various aspects and embodiments.

FIG. 8 illustrates a flow chart of an example method 800 for adaptively controlling wireless transition timers associated with wireless states in relation to use of applications by a UE in a communication network, in accordance with various aspects and embodiments. In accordance with various aspects, the method 800 can be utilized by, for example, a transition management component.

At 802, a wireless transition timer can be identified (e.g., adaptively identified or adjusted), based at least in part on type of application or changes in application behavior, type of content associated with the application, user behavior or activity in relation to the application or UE, type of IP protocol, and/or other factors, for use in relation to an application associated with a UE during a communication session to facilitate transitioning the UE between a first wireless state and a second wireless state. The transition management component can identify or adjust the wireless transition timer for use in relation to the application during the communication session to facilitate transitioning the UE between the first wireless state (e.g., a relatively higher power wireless state, such as the DCH state) and the second wireless state (e.g., a relatively lower power wireless state, such as the FACH state or Idle state). For instance, the transition management component can analyze a mapping between wireless transition timers (and/or associated wireless states) and type of application or changes in application behavior, type of content associated with the application, user behavior or activity in relation to the application or UE, type of IP protocol, and/or other factors, and can identify a desirable wireless transition timer based at least in part on the mapping. The transition management component also can identify one or more other wireless transition timers for use in relation to the application during the communication session to facilitate transitioning the UE between available wireless states (e.g., Idle state, URA state, FACH state, DCH state, etc.).

At 804, transition of the UE between the first wireless state and the second wireless state can be controlled (e.g., adaptively controlled) based at least in part on the wireless transition timer. The transition management component can facilitate transitioning the UE between the first wireless state and the second wireless state based at least in part on the wireless transition timer. For example, when the wireless transition timer elapses, or the amount of elapsed time exceeds the amount of time associated with the wireless transition timer, the transition management component can facilitate transitioning the UE from the first wireless state to the second wireless state.

Figure 9:
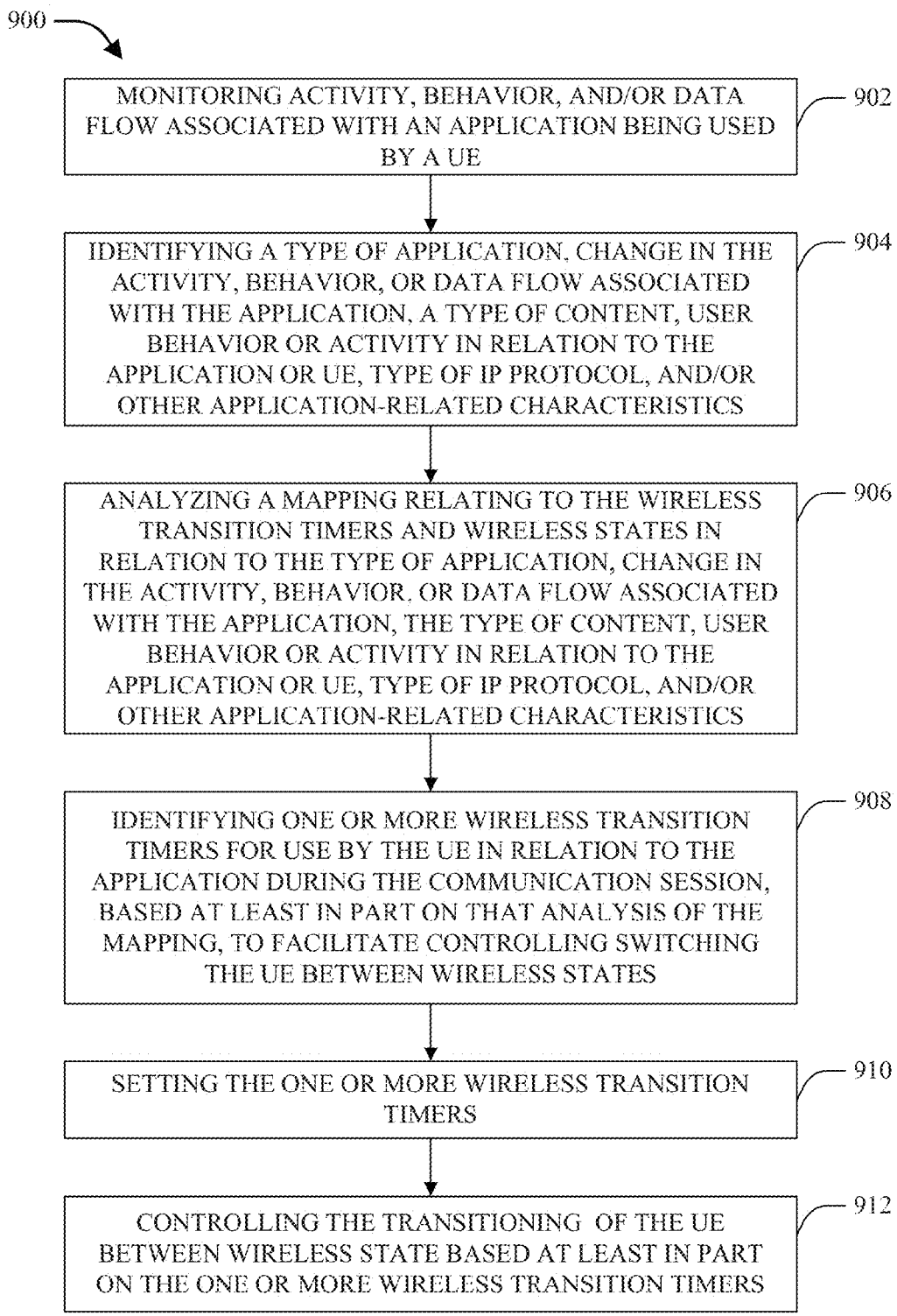
FIG. 9 depicts a flow diagram of another example method for adaptively controlling wireless transition timers associated with wireless states in relation to use of applications by a UE in a communication network, in accordance with various aspects and embodiments.

Referring next to FIG. 9, depicted is a flow chart of another example method 900 for adaptively controlling wireless transition timers associated with wireless states in relation to use of applications by a UE in a communication network, in accordance with various aspects and embodiments. In accordance with various aspects, the method 900 can be utilized by a transition management component, for example.

At 902, activity, behavior, and/or data flow associated with an application being used by a UE can be monitored. The transition management component can monitor activity, behavior, and/or data flow associated with the application during a communication session involving the UE and the application.

At 904, a type of application, change in the activity, behavior, or data flow associated with the application, a type of content, user behavior or activity in relation to the application or UE, type of IP protocol, and/or other application-related characteristics can be identified. The transition management component can analyze information relating to the activity, behavior, and/or data flow associated with the application. Based at least in part on that analysis, the transition management component can identify the type of application, change in the activity, behavior, or data flow associated with the application, the type of content, user behavior or activity in relation to the application or UE, type of IP protocol, and/or other application-related characteristics.

At 906, a mapping relating to the wireless transition timers and wireless states can be analyzed in relation to the type of application, change in the activity, behavior, or data flow associated with the application, the type of content, user behavior or activity in relation to the application or UE, type of IP protocol, and/or other application-related characteristics. The transition management component can retrieve the mapping from a timer look-up table in a data store associated with the transition management component. The transition management component can analyze the mapping along with the information relating to the type of application, change in the activity, behavior, or data flow associated with the application, the type of content, user behavior or activity in relation to the application or UE, type of IP protocol, and/or other application-related characteristics.

At 908, one or more wireless transition timers can be identified for use by the UE in relation to the application during the communication session, based at least in part on that analysis of the mapping, to facilitate controlling switching the UE between wireless states. The transition management component can identify one or more wireless transition timers respectively associated with one or more of the wireless states, based at least in part on the analysis of the mapping. For example, the transition management component can apply the respective items of information relating to the type of application, change in the activity, behavior, or data flow associated with the application, the type of content, user behavior or activity in relation to the application or UE, type of IP protocol, and/or other application-related characteristics to generate a result from the mapping identifying or indicating one or more wireless transition timers to use in relation to the application during the communication session to facilitate controlling switching the UE between wireless states at desired (e.g., optimal or acceptable) times.

At 910, the one or more wireless transition timers can be set. The transition management component can set the one or more wireless transition timers identified from the mapping. At 912, the transitioning (e.g., switching) of the UE between wireless states can be controlled based at least in part on the one or more wireless transition timers. The transition management component can control switching of the UE between wireless states based at least in part on the one or more wireless transition timers. For example, while the UE is in the DCH state, the transition management component can monitor activity on the Cell_DCH and a first wireless transition timer of the one or more wireless transition timers can be used to facilitate to determining whether to transition the UE from the DCH state to another wireless state (e.g., FACH state). If the transition management component determines that there has been no activity or low activity on the Cell_DCH for a period of time that indicates the amount of time of the first wireless transition timer has elapsed, the transition management component can determine that the UE is to be transitioned from the DCH state to another wireless state (e.g., FACH state). The transition management component can transition the UE from the DCH state to the other wireless state, and the UE can switch from the Cell_DCH to a different communication connection or channel (e.g., Cell_FACH).

Figure 10:
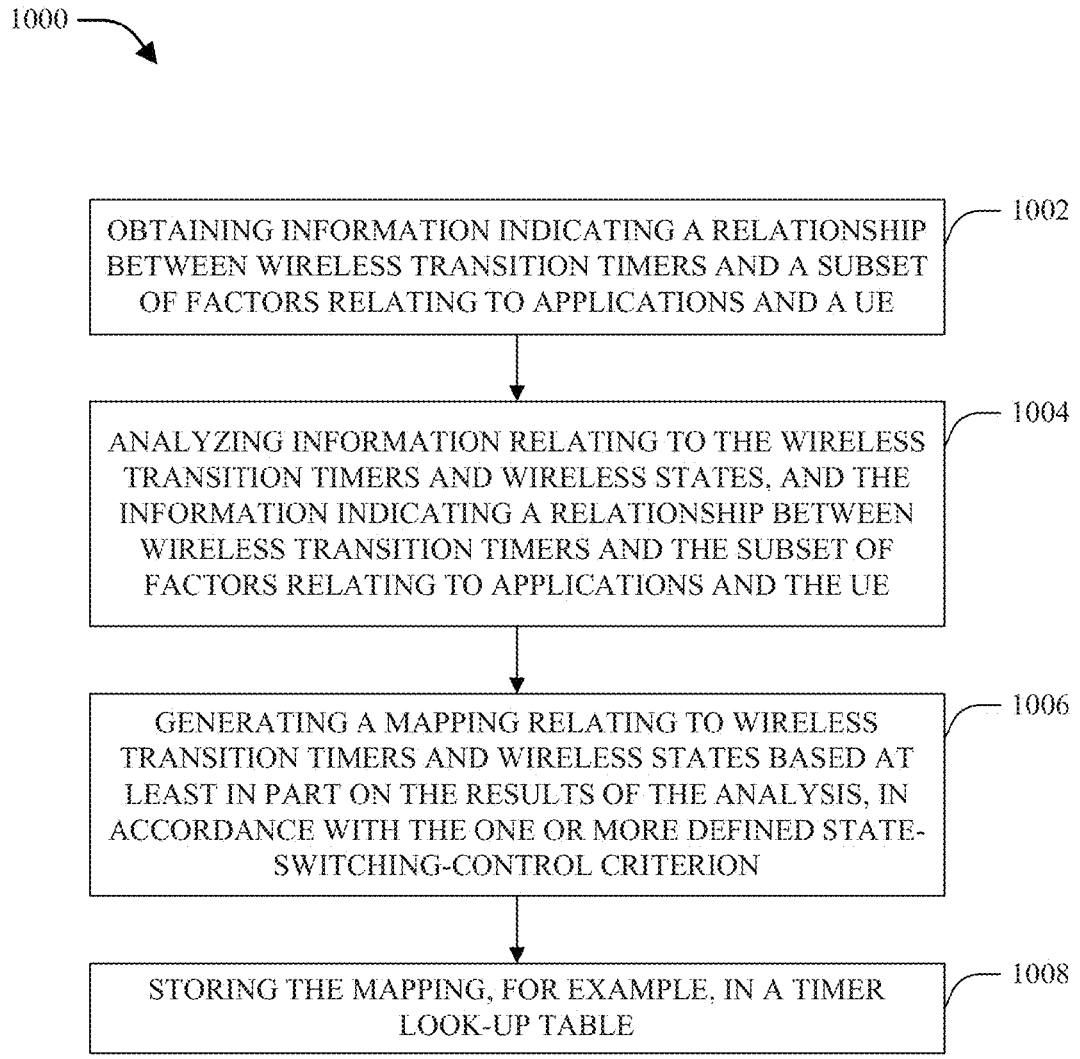
FIG. 10 is a flow diagram of still another example method for generating a mapping relating to wireless transition timers and wireless states to facilitate adaptively controlling wireless transition timers associated with wireless states in relation to use of applications by a UE in a communication network, in accordance with various aspects and embodiments.

Turning to FIG. 10, illustrated is a flow chart of still another example method 1000 for generating a mapping relating to wireless transition timers and wireless states to facilitate adaptively controlling wireless transition timers associated with wireless states in relation to use of applications by a UE in a communication network, in accordance with various aspects and embodiments. The method 1000 can be employed by a transition management component, for example.

At 1002, information indicating a relationship between wireless transition timers and a subset of factors relating to applications and a UE can be obtained. The transition management component can obtain information relating to wireless transition timers; wireless states; various types of applications; the effects of changes in the activity, behavior, or data flow associated with respective types of applications in relation to wireless transition timers and wireless states; various types of content; the effects of user behavior or activity associated with respective applications or the UE in relation to wireless transition timers and wireless; the effects of other application-related characteristics; and/or IP protocols associated with communications by the UE during use of the application. The transition management component can obtain all or a portion of such information from monitoring or probing activity, behavior, or data flow associated with respective applications and/or can receive all or a portion of such information from the communication network.

At 1004, information relating to the wireless transition timers and wireless states, and the information indicating a relationship between wireless transition timers and the subset of factors relating to applications and the UE can be analyzed. The transition management component can analyze the information relating to the wireless transition timers and wireless states, and the information indicating the relationship between wireless transition timers and the subset of factors relating to applications and the UE, and can apply one or more defined state-switching-control criterion as part of the analysis.

At 1006, a mapping relating to wireless transition timers and wireless states can be generated based at least in part on the results of the analysis, in accordance with the one or more defined state-switching-control criterion. The transition management component can generate the mapping relating to wireless transition timers and wireless states, based at least in part on the results of the analysis, in accordance with the one or more defined state-switching-control criterion. The mapping generated by the transition management component can facilitate enabling improved (e.g., optimal, increased, etc.) efficiency in performance by the UE, applications, and the communication network, as more fully disclosed herein.

At 1008, the mapping can be stored, for example, in a timer look-up table. The transition management component can be stored in the timer look-up table, which can be stored in a data store associated with the transition management component. When the UE is using a particular application, the transition management component can retrieve the mapping from the timer look-up table. The transition management component can identify one or more wireless transition timers to respectively employ for one or more of the wireless states, based at least in part on the mapping and information relating to the type of application, change in the activity, behavior, or data flow associated with the application, the type of content associated with the application, user behavior or activity in relation to the application or UE, other application-related characteristics, and/or IP protocols associated with communications by the UE during use of the application. The transition management component can apply the one or more wireless transition timers to facilitate controlling switching the UE between wireless states during a communication session involving the UE and application.

Figure 11:
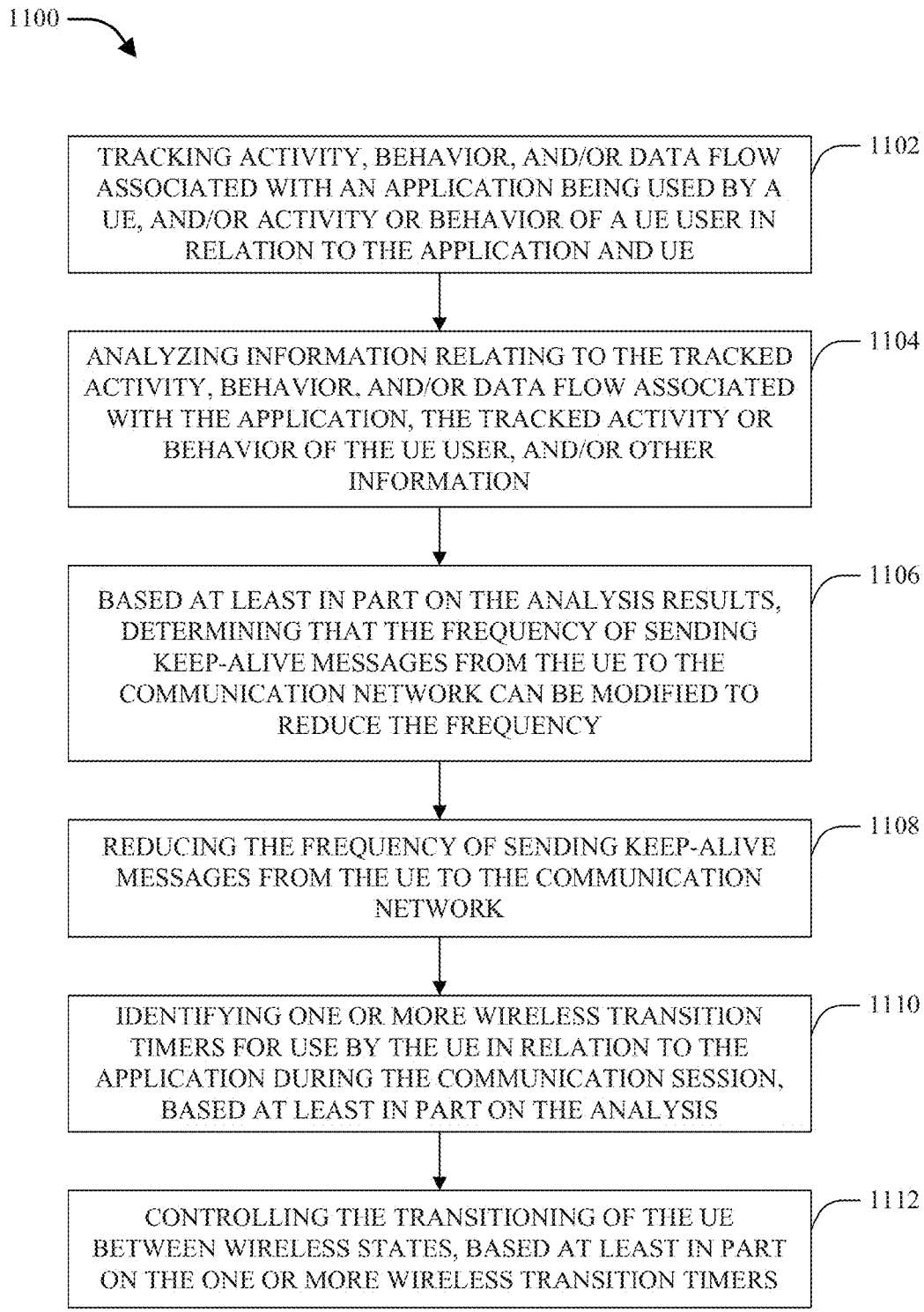
FIG. 11 illustrates a flow diagram of an example method adaptively controlling wireless transition timers associated with wireless states and signaling in relation to use of applications by a UE in a communication network to facilitate controlling resource usage associated with the UE, in accordance with various aspects and embodiments.

FIG. 11 presents a flow chart of an example method 1100 for adaptively controlling wireless transition timers associated with wireless states and signaling (e.g., keep-alive messages) in relation to use of applications by a UE in a communication network to facilitate controlling resource usage associated with the UE, in accordance with various aspects and embodiments. The method 1100 can be employed by a transition management component, for example.

At 1102, activity, behavior, and/or data flow associated with an application being used by a UE, and/or activity or behavior of a UE user in relation to the application and UE, can be tracked over time (e.g., over a defined time period). The transition management component can monitor and track activity, behavior, and/or data flow associated with the application, and/or activity or behavior of a UE user in relation to the application and UE, during one or more communication sessions involving the UE and the application. The application can employ a standard policy whereby the application sends keep-alive messages to the communication network at a standard frequency (e.g., every 5 seconds, in accordance with the standard policy) to facilitate maintaining an always-on communication connection between the UE and the communication network.

At 1104, information relating to the tracked activity, behavior, and/or data flow associated with the application, the tracked activity or behavior of the UE user, and/or other information can be analyzed. The transition management component can analyze the tracked activity, behavior, and/or data flow associated with the application, the tracked activity or behavior of the UE user in relation to the application and UE, and/or other information to facilitate determining whether the frequency of sending keep-alive messages associated with the application is to be modified (e.g., reduced) and identifying one or more wireless transition timers to use during the communication session.

At 1106, based at least in part on the analysis results, it can be determined that the frequency of sending keep-alive messages from the UE to the communication network can be modified to reduce the frequency. The transition management component determine that the frequency of sending keep-alive messages from the UE to the communication network can be modified to reduce the frequency, based at least in part on the analysis results. For example, the transition management component can analyze the information and can determine that the application data flow between the UE and communication network is sufficiently low enough and/or the user activity with the application is sufficiently low enough that it is not necessary to maintain the always-on connection at all times during the communication session, and can determine that the frequency of sending keep-alive messages can be reduced (e.g., to facilitate reducing resource usage), while still maintaining the integrity associated with the always-on connection and performance of the application.

At 1108, the frequency of sending keep-alive messages from the UE to the communication network can be reduced. The transition management component can identify a new reduced frequency (e.g., every 2 minutes or other suitable frequency) of sending keep-alive messages from the UE to the communication network that will suitably (e.g., optimally, most efficiently, acceptably, etc.) reduce resource usage associated with the UE and/or the network, while still maintaining the integrity associated with the always-on connection and performance of the application.

The transition management component can facilitate reducing the frequency of sending keep-alive messages by, for example, intercepting all or at least some of the keep-alive messages sent by the application before delivery to the network and storing those intercepted messages in a queue, wherein the transition management component can control the sending of the keep-alive messages (e.g., retrieved or released from the queue) to the communication network at the new reduced frequency. As another example, the transition management component can allow a keep-alive message to be sent to the communication network, intercept a subset of keep-alive messages and discard them, and allow another keep-alive message to be sent to the communication network such that the allowed keep-alive messages are sent to the communication network in accordance with the new reduced frequency, wherein this process of allowing some of the keep-alive messages and intercepting subsets of keep-alive messages in between the allowed keep-alive messages can continue during the communication session. In still another example, if the application is intelligent, adaptable, or programmable, the transition management component can transmit an instruction or request to have the application reduce the frequency of sending keep-alive messages to the new reduced frequency.

At 1110, one or more wireless transition timers can be identified for use by the UE in relation to the application during the communication session, based at least in part on the analysis. The transition management component can identify one or more wireless transition timers respectively associated with one or more of the wireless states, based at least in part on the analysis at operation 1104 as well as an analysis of a mapping relating to wireless transition timers and wireless states. For instance, according to the analyses and mapping, the transition management component can identify a first subset of wireless transition times based at least in part on identifying the application as a first type of application and/or identifying a first type of content associated with the application, and/or can identify a second subset of wireless transition timers based at least in part on identifying the application as a second type of application and/or identifying a second type of content associated with the application.

At 1112, the transitioning (e.g., switching) of the UE between wireless states can be controlled, based at least in part on the one or more wireless transition timers. The transition management component can control switching of the UE between wireless states based at least in part on the one or more wireless transition timers as well as the sending of keep-alive messages at the new reduced frequency.

Figure 12:
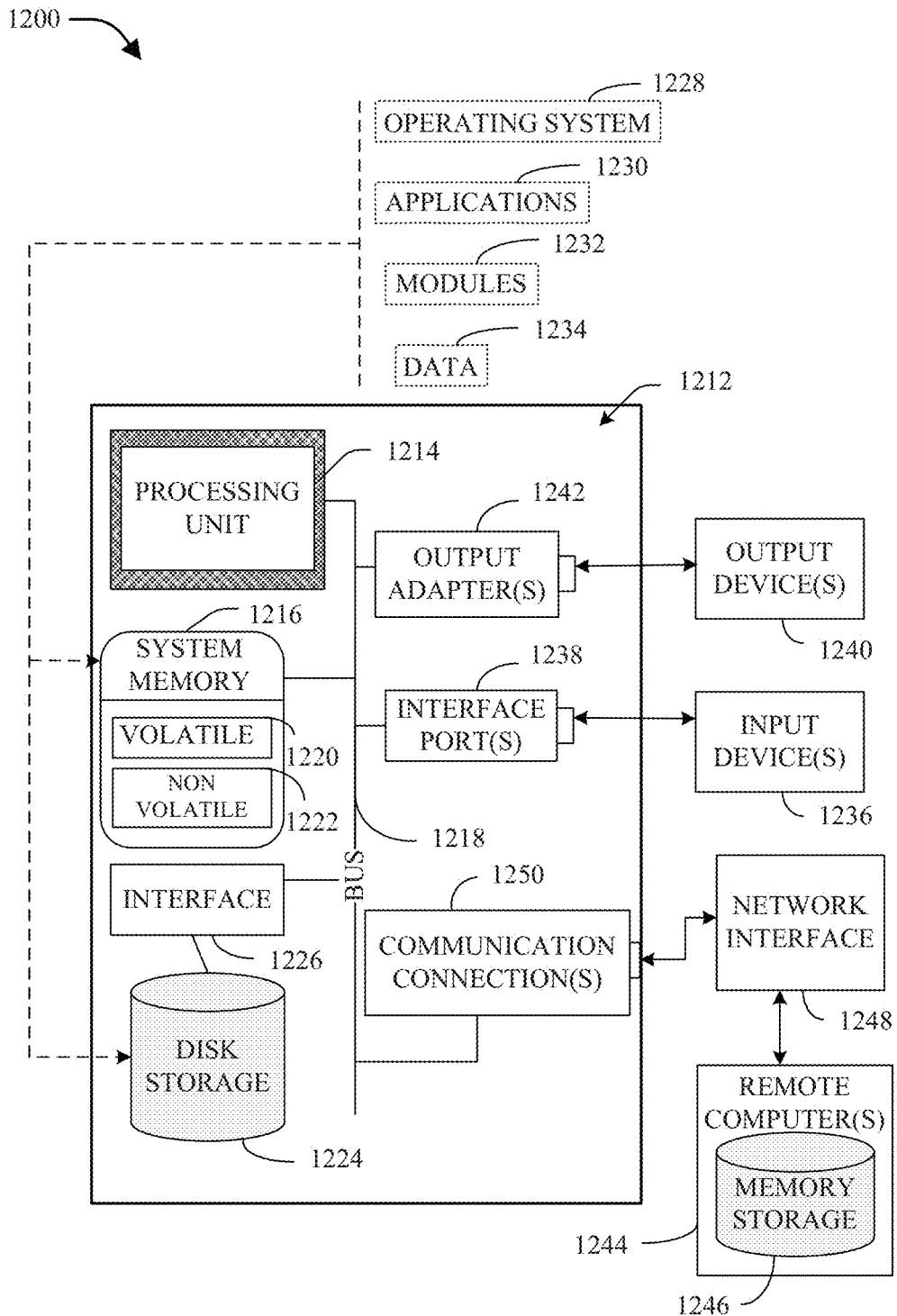
FIG. 12 is a schematic block diagram illustrating a suitable operating environment.
Figure 13:
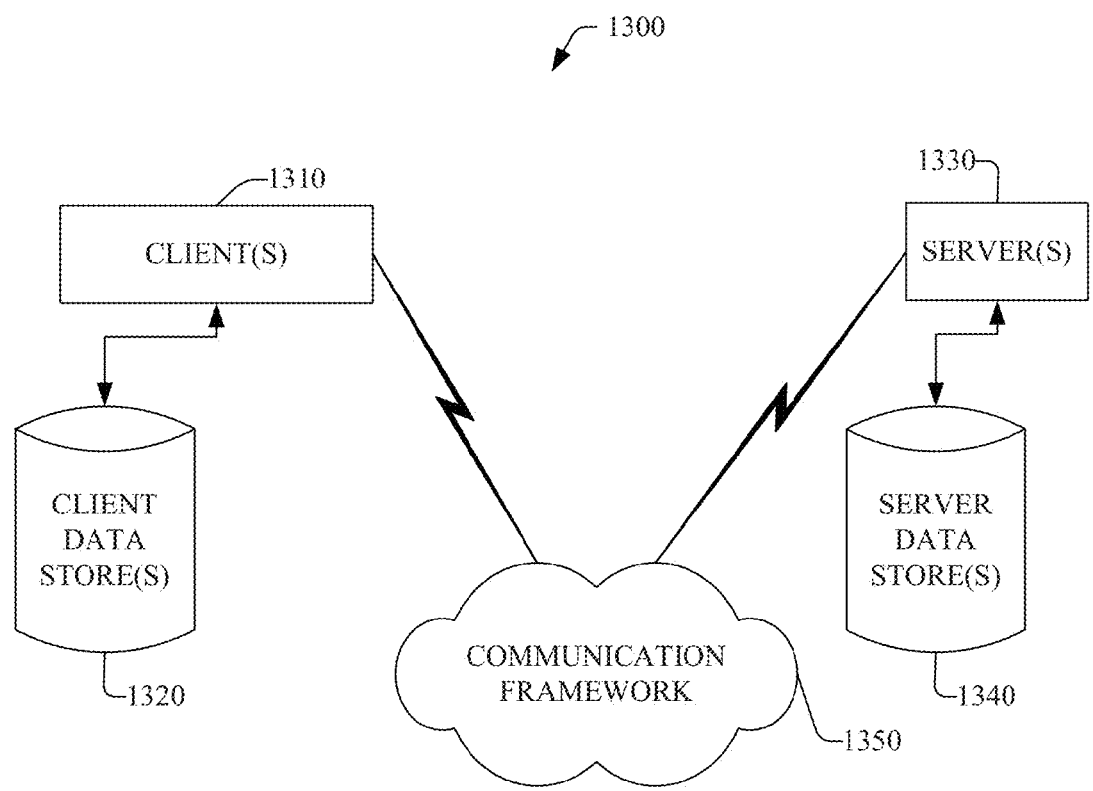
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the disclosed methods may be practiced with other computer system configurations, including single-processor or multi-processor computer systems, mini-computing devices, mainframe computers, as well as personal computers, hand-held computing devices (e.g., PDA, phone, electronic tablets or pads, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 12, a suitable environment 1200 for implementing various aspects of this disclosure includes a computer 1212. The computer 1212 includes a processing unit 1214, a system memory 1216, and a system bus 1218. It is to be appreciated that the computer 1212 can be used in connection with implementing one or more of the systems or components shown and described in connection with FIGS. 1-7, or otherwise described herein. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 also includes removable/non-removable, volatile/non-volatile computer storage media. FIG. 12 illustrates, for example, a disk storage 1224. Disk storage 1224 includes, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used, such as interface 1226.

FIG. 12 also depicts software that acts as an intermediary between users and the basic computer resources described in the suitable operating environment 1200. Such software includes, for example, an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored, e.g., in system memory 1216 or on disk storage 1224. It is to be appreciated that this disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 (e.g., computing system) with which the subject matter of this disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing this disclosure, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

It is to be noted that aspects, features, and/or advantages of the disclosed subject matter can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as Internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions, wherein the processor can directly perform operations, and/or the processor can indirectly perform operations, for example, by directing or controlling one or more other components to perform operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "Node B," "Evolved Node B" (eNode B or eNB), "Home Node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, UE, AP, communication network, application, transition management component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   determining, by a system comprising a processor, a wireless transition timer based on information relating to activity of an application and a wireless communication device; and
   controlling, by the system, switching of the wireless communication device between wireless states based on the wireless transition timer, wherein the determining the wireless transition timer comprises determining the wireless transition timer is to be selected to replace another wireless transition timer based on a determination that a change in a data flow associated with the application has occurred.

2. The method of claim 1, wherein the determining the wireless transition timer further comprises:
   in response to the determining the change in the data flow associated with the application, determining the wireless transition timer based on a mapping relating to the change in the data flow, the wireless states, and a set of wireless transition timers, comprising the wireless transition timer, wherein the change in the data flow comprises a change from a first amount of data flow to a second amount of data flow.

3. The method of claim 1, further comprising:
   determining, by the system, an application type of the application and another application type of another application;
   determining, by the system, a set of wireless transition timers, comprising the wireless transition timer, based on the application type of the application; and
   determining, by the system, a set of different wireless transition timers based on the other application type of the other application.

4. The method of claim 1, further comprising:
   adapting, by the system, transitioning of the wireless communication device between the wireless states based on other information relating to a predicted wireless resource usage of the application over a defined period of time.

5. The method of claim 1, further comprising:
   monitoring, by the system, the activity of the application and the wireless communication device; and
   determining, by the system, an application type of the application, the change in the data flow associated with the application, and a type of content associated with the application, based on the activity of the application and the wireless communication device.

6. The method of claim 1, further comprising:
   analyzing, by the system, a mapping relating to the wireless states and a set of wireless transition timers, comprising the wireless transition timer, with respect to an application type of the application, the change in the data flow associated with the application, and a type of content associated with the application; and
   determining, by the system, the set of the wireless transition timers based on the mapping, wherein the controlling the switching of the wireless communication device between the wireless states comprises controlling the switching of the wireless communication device between the wireless states based on the set of wireless transition timers, and wherein the wireless states comprise an idle state, a dedicated-channel state, a forward-access-channel state, and a paging state.

7. The method of claim 1, further comprising:
generating, by the system, a mapping relating to the wireless states and a set of wireless transition timers, comprising the wireless transition timer, with respect to an application type of the application, the change in the data flow associated with the application, and a type of content associated with the application based on information relating to the set of wireless transition timers, the wireless states, the application type, the change in the data flow, and the type of the content; and
storing, by the system, the mapping in a data store.

8. The method of claim 7, further comprising:
receiving, by the system, update information relating to the mapping;
modifying, by the system, the mapping to generate an updated mapping based on the update information;
modifying, by the system, the wireless transition timer to an updated wireless transition timer based on the updated mapping; and
controlling, by the system, switching of the wireless communication device between the wireless states based on the updated wireless transition timer.

9. The method of claim 1, further comprising:
to facilitate maintaining a dedicated communication connection between the wireless communication device and a communication network device, determining, by the system, that a frequency of sending of keep-alive messages from the wireless communication device to the communication network device is able to be reduced to a lower frequency than the frequency to facilitate reducing resource usage associated with the wireless communication device concurrently with maintaining a defined acceptable level of communication between the wireless communication device and the communication network device; and
controlling the sending of the keep-alive messages from the wireless communication device to the communication network device based on the lower frequency.

10. The method of claim 1, wherein the controlling the switching of the wireless communication device between the wireless states comprises controlling switching of the wireless communication device between the wireless states based on a set of wireless transition timers, comprising the wireless transition timer, and wherein a first wireless state of the wireless states is associated with a first amount of power consumption by the wireless communication device that is higher than a second amount of power consumption by the wireless communication device that is associated with a second wireless state of the wireless states.

11. A system, comprising:
a processor; and
a memory that stores executable instructions that, when executed by the processor, facilitate performance of operations, comprising:
identifying a wireless transition timer based on information relating to activity of an application and a mobile device; and
adaptively controlling transition of the mobile device between wireless states based on the wireless transition timer, wherein the identifying the wireless transition timer comprises identifying that a different wireless transition timer is to be changed to the wireless transition timer based on a determination that a change in a data flow associated with the application has occurred.

12. The system of claim 11, wherein the identifying the wireless transition timer further comprises:
in response to the determination relating to the change in the data flow associated with the application, identifying the wireless transition timer based on a mapping relating to the wireless states and wireless transition timers in connection with the change in the data flow associated with the application, wherein the wireless transition timers comprise the wireless transition timer.

13. The system of claim 11, wherein the operations further comprise:
determining an application type of the application and another application type of another application;
determining wireless transition timers, comprising the wireless transition timer, based on the application type of the application; and
determining other wireless transition timers based on the other application type of the other application.

14. The system of claim 11, wherein the operations further comprise:
adjusting the transition of the mobile device between the wireless states based on other information relating to a predictive usage of a wireless resource by the application over a defined period of time.

15. The system of claim 11, wherein the operations further comprise:
monitoring the activity of the application and the mobile device;
receiving information relating to the activity of the application and the mobile device; and
identifying an application type of the application, the change in the data flow associated with the application, and a type of content associated with the application based on the information relating to the activity of the application and the mobile device.

16. The system of claim 11, wherein the operations further comprise:
analyzing a mapping relating to wireless transition timers and the wireless states in connection with an application type of the application, the change in the data flow associated with the application, and a type of content associated with the application, wherein the wireless transition timers comprise the wireless transition timer, and wherein the wireless states comprise an idle state, a dedicated-channel state, a forward-access-channel state, and a paging state; and
determining the wireless transition timers, comprising the wireless transition timer, based on the mapping.

17. The system of claim 11, wherein the operations further comprise:
generating a mapping relating to wireless transition timers and the wireless states in connection with an application type of the application, the change in the data flow associated with the application, and a type of content associated with the application based on information relating to the wireless transition timers, the wireless states, the application type, the change in the data flow, and the type of the content, wherein the wireless transition timers comprise the wireless transition timer; and
storing the mapping in a data store.

18. The system of claim 17, wherein the operations further comprise:

receiving update information relating to the mapping;

modifying the mapping to generate an updated mapping based on the update information adjusting the wireless transition timer to an updated wireless transition timer based on the updated mapping; and controlling the transition of the mobile device between the wireless states based on the updated wireless transition timer.

19. A computer-readable storage device storing executable instructions that, in response to execution, cause a system comprising a processor to perform operations, comprising:

determining a wireless transition timer based on information relating to activity of an application and a wireless device; and controlling transition of the wireless device between wireless states based on the wireless transition timer, wherein the determining the wireless transition timer comprises determining another wireless transition timer is to be modified to the wireless transition timer based on determining a change in a data flow associated with the application has occurred.

20. The computer-readable storage device of claim 19, wherein the operations further comprise:

adapting the transition of the wireless device between the wireless states based on other information relating to a predicted wireless resource usage of the application over a defined period of time.

\* \* \* \* \*